(12) United States Patent
Dombek et al.

(10) Patent No.: US 6,363,942 B1
(45) Date of Patent: Apr. 2, 2002

(54) PERFORATING APPARATUS

(75) Inventors: Manfred Dombek, Dassendorf; Helmut Voss, Lokstedt, both of (DE)

(73) Assignee: Hauni Maschinenbau AG, Hamburg (DE)

( * ) Notice: Subject to any disclaimer, the term of this patent is extended or adjusted under 35 U.S.C. 154(b) by 0 days.

(21) Appl. No.: 09/457,346

(22) Filed: Dec. 8, 1999

(30) Foreign Application Priority Data

Dec. 8, 1998 (DE) .......................................... 198 56 413

(51) Int. Cl.[7] ................................................. A24C 1/38
(52) U.S. Cl. ............. 131/281; 219/121.71; 219/121.77; 219/121.6; 219/121 L
(58) Field of Search ...................... 131/281; 219/121.71, 219/121.77, 121.6, 121 L

(56) References Cited

U.S. PATENT DOCUMENTS

| | | | | |
|---|---|---|---|---|
| 3,848,104 A | * | 11/1974 | Locke | .................... 219/121 L |
| 5,148,818 A | | 9/1992 | Arthur | |
| 5,598,855 A | * | 2/1997 | Rizzoli et al. | .............. 131/281 |

FOREIGN PATENT DOCUMENTS

| | | |
|---|---|---|
| DE | 27 51 522 C2 | 8/1978 |
| DE | 33 10 930 C2 | 10/1983 |
| DE | 34 31 051 C2 | 3/1985 |
| DE | 34 31 067 C2 | 3/1985 |
| DE | 42 18 266 A1 | 12/1993 |

* cited by examiner

*Primary Examiner*—Stanley S. Silverman
*Assistant Examiner*—Mark Halpern
(74) *Attorney, Agent, or Firm*—Venable; Robert Kinberg

(57) ABSTRACT

The invention concerns a perforating apparatus for producing openings in a peripheral surface of a substantially elongate, cylindrical object, in particular a cigarette, comprising a light source for producing at least one high-energy light beam, by means of which the openings can be produced in the object, an operative zone which can be produced by a guidance tracking means for guided tracking of the light beam and within which the light beam acts on an object moving through the operative zone, to produce the openings, rolling means for producing a rotary movement of the objects about their longitudinal axis while the objects are moving through the operative zone in order to expose the peripheral surface to the light beam, and transport means for conveying the object through the operative zone. The invention is characterised by a light-refracting means through which the light beam is passed before reaching the operative zone so that upon guided tracking of the light beam the light beam remains focused substantially everywhere within the operative zone.

49 Claims, 16 Drawing Sheets

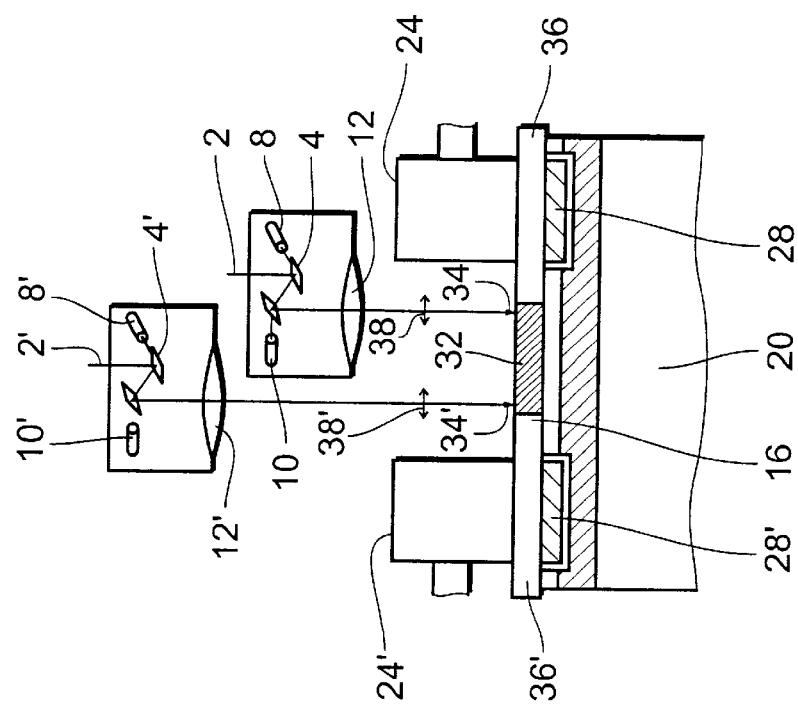
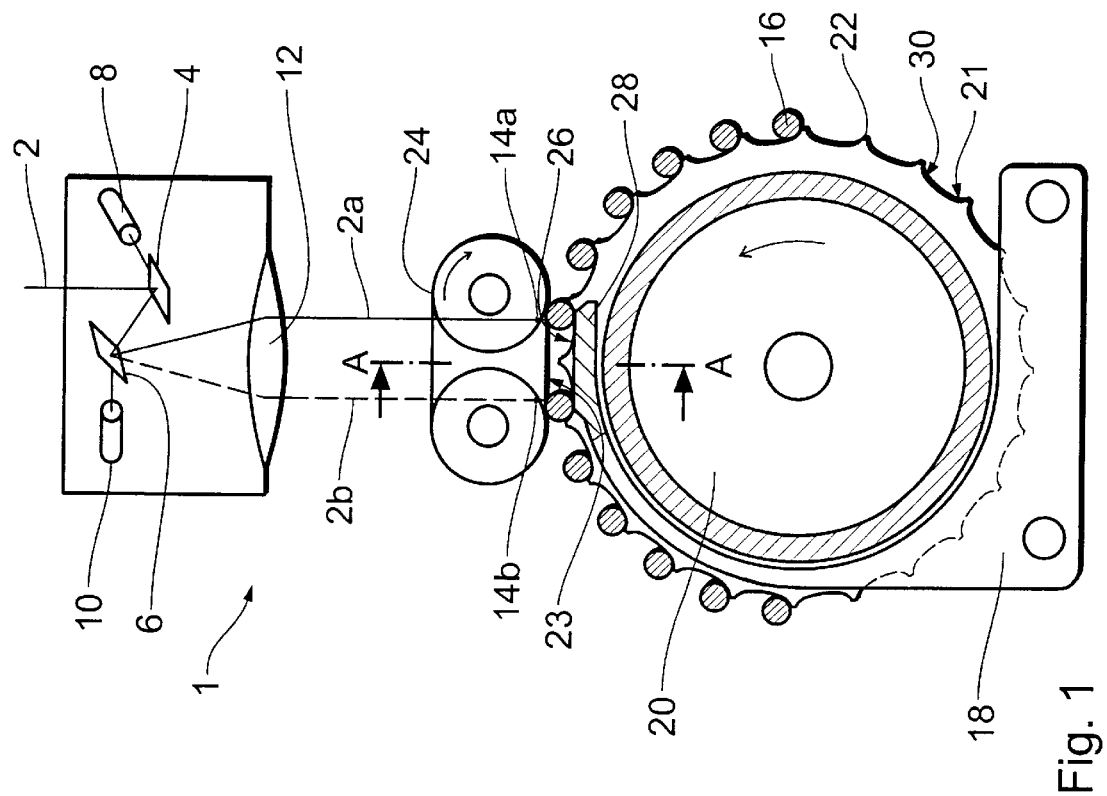
Fig. 2
Fig. 1

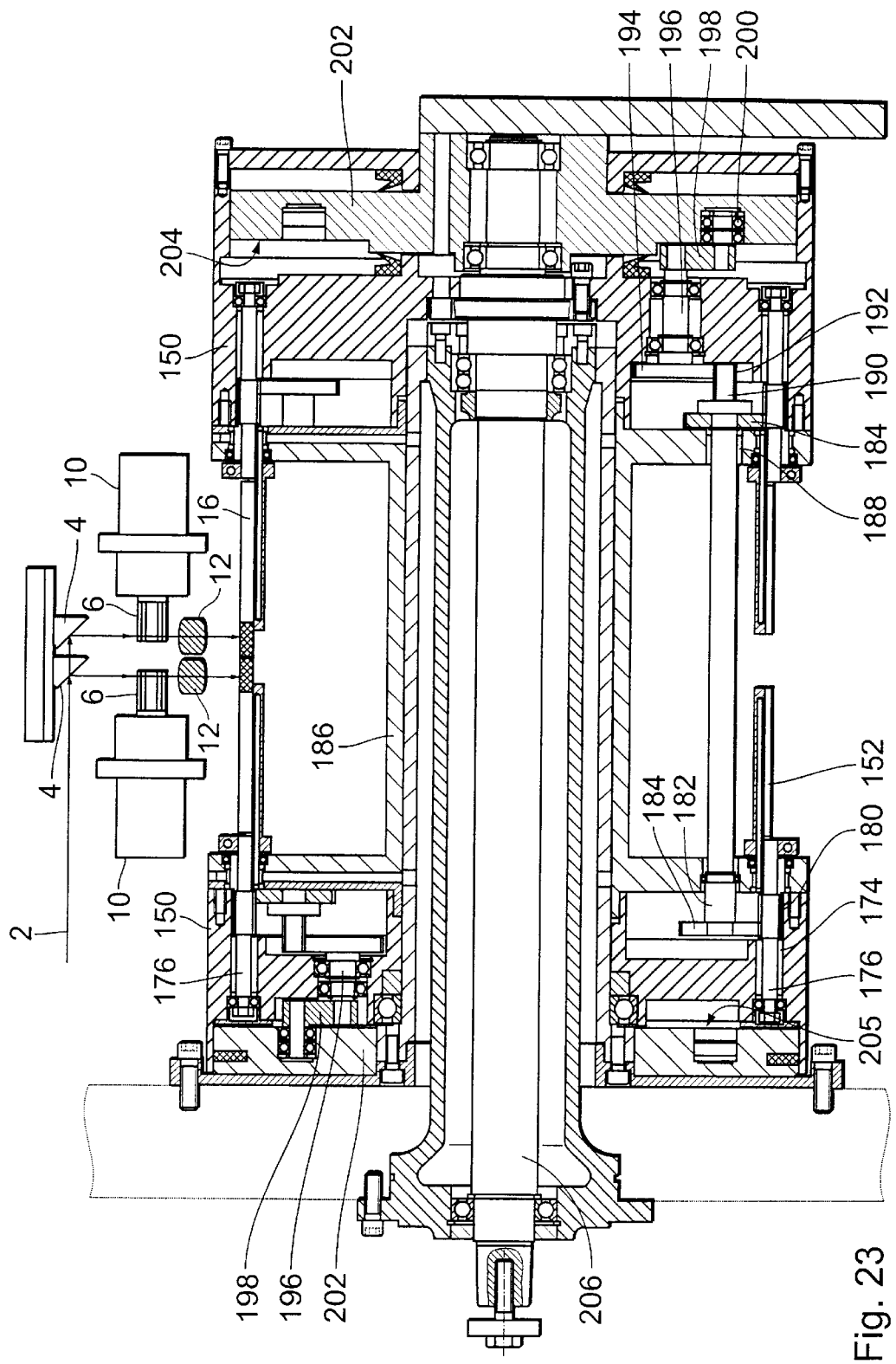

PERFORATING APPARATUS

CROSS-REFERENCE TO RELATED APPLICATIONS

This application claims the priority of Patent Application DE198564139, filed Dec. 8, 1998 in Germany, the subject matter of which is incorporated herein by reference.

BACKGROUND OF THE INVENTION

The invention concerns a perforating apparatus for producing openings in a peripheral surface of a substantially elongate, cylindrical object, in particular a cigarette, comprising a light source for producing at least an energy-rich light beam by means of which the openings can be formed in the object, an operative zone which can be produced by a guidance tracking means for guidance tracking of the light beam and within which the light beam acts on an object moving through the operative zone for forming the openings therein, rolling means for producing a rotary movement of the objects about their own longitudinal axis while the objects move through the operative zone in order to expose the peripheral surface to the light beam, and transport means for conveying the object through the operative zone.

Apparatuses for providing perforations in elongated cylindrical objects are known from the prior art, but none have the advantages provided for by the current invention. Such apparatuses serve in the prior art, in particular in the tobacco-processing industry, to provide smoking articles, in particular cigarettes, with a zone affording the desired permeability for air. This zone involving the desired permeability for air is usually formed in a sheathing material strip of the smoking article or cigarette. That perforation in the peripheral surface of the smoking article, which is mostly provided in the region of the tip end, is of significance in the cigarette industry as smoking articles which are perforated in that way provide that cool air from the ambient atmosphere is added to the smoke when the smoker draws on the smoking article or cigarette. That cool air serves in turn to influence the proportions of nicotine and condensate in the smoke.

In regard to forming perforations in the peripheral surface of a substantially elongate, cylindrical object, in particular a cigarette, a fundamentally important consideration is that the perforation can be produced uniformly and reproducibly. For that purpose, lasers are mostly used as the light source in the state of the art. In that situation, the size of the holes forming the openings in the peripheral surface can be varied by means of suitable focusing of the laser beam.

In the state of the art, rolling drums and the like are mostly used as the transport means for the cigarettes to be perforated. Those rolling drums convey the cigarettes with their axis disposed transversely, through the point of impingement of the laser beam. In order to achieve a perforation effect not only at one location on the peripheral surface but in order to produce the perforation effect at least over a part of the periphery, the cigarette, while it is being conveyed with its axis in a transverse position by the rolling drum serving as the transport means, is usually rolled by means of rolling means which engage the cigarettes from the side in opposite relationship to the rolling drum. It is important in regard to rolling the object between two surfaces in that way that the cigarette or the smoking article is subjected to pressure forces and the like, to the minimum possible extent. For, forces of that kind have an adverse effect on the quality of the cigarette.

A known perforating apparatus which operates with a laser is shown for example in U.S. Pat. No. 5,148,818. The reference discloses a perforating apparatus using a plurality of rollers as the transport means for the cigarettes. A conveyor belt serving as the rolling means rotates on those rollers so that the cigarettes are disposed between the conveyor belt and the rollers. Because the conveyor belt moves at a different speed from the rollers, the cigarettes which are disposed between the conveyor belt and the rollers are caused to perform a rotary movement about their own axis. In addition, disposed at the centre of one of the rollers is a laser with a laser beam which also rotates and which burns the perforations into the rotating cigarettes.

A disadvantage with this prior art device is that the laser beam must also rotate with one of the rollers and that the rotary movement of the laser beam must be exactly matched to the conveying movement of the cigarettes. This arrangement involves a very high level of technical complication and expenditure to operate and thus a very high level of cost.

A further device is known from DE 33 10 930. This reference discloses a perforating apparatus in which, with the cigarettes circulating on a drum, the appropriate perforations are formed in the sheathing or casing of the cigarettes to be perforated by means of a heart-shaped reflector in which a laser beam circulates.

This device similarly suffers from the disadvantages of requiring a very high level of technical complication and expenditure, as it is necessary to rotate the laser beam in the heart-shaped reflector. This must be done while simultaneously rotating the cigarettes synchronously with the rotational movement or reflection of the laser beam to the correct position so that the perforations are formed uniformly in the casing of the cigarettes. This synchronisation is difficult and costly to maintain.

Still a further device is known from DE 34 31 051. In that publication, a laser is also connected to a complicated reflector arrangement. In this case also, the laser beam is guided by way of a highly complicated arrangement of mirrors and rotating reflectors to the location to be perforated, on the casing of the cigarette that rotates on a roller. This apparatus is also extremely complicated and expensive and in addition can only be synchronised with a very great deal of difficulty, suffering from the same disadvantage of cost and complexity of the earlier cited devices.

A further device is known from DE 34 31 067. This reference represents a combination of the teachings of the two previously disclosed references. It therefore also suffers from the disadvantages described hereinbefore with reference to the last two publications.

A further perforating apparatus is known from DE 42 18 266. In this apparatus, the cigarettes that are being conveyed are disposed between a plurality of rollers so that they can be rotated between these rollers. Carried on the conveyor roller for the cigarettes is a polygonal mirror which projects a laser beam onto the cigarettes to be perforated.

This arrangement also suffers from the disadvantage that the cigarettes must be perforated by means of an expensive and complicated polygonal mirror configuration. Furthermore, this apparatus suffers from the disadvantage that the cigarettes are respectively disposed between three rollers so that the individual cigarettes are subjected to the effect of very high forces which can have a disadvantageous effect on the condition of the cigarette.

Finally, DE 27 51 522 discloses a further perforating apparatus. In this perforating apparatus, the cigarettes are caused to rotate about their own axis between a rolling drum and a so-called rolling block. During the rotary movement of the cigarettes, a laser beam perforates the cigarettes. As, during their rolling movement between the rolling drum and the rolling block, the cigarettes are advanced in the rolling passage formed in that way, relative to the laser, the laser beam is guided in such a way as to track the cigarette which moves in the rolling passage. That guidance tracking action for the laser beam is performed in this prior-art perforating apparatus by means of a drum, which at its periphery carries a plurality of mirrors. This rotating polygonal mirror arrangement must be activated synchronously with the movement of the cigarettes in the rolling passage formed by the rolling block and the rolling drum. This state of the art therefore requires a very high level of synchronisation and precision in order to be able to achieve a satisfactory perforating result.

Besides the disadvantages just referred to above, the device further suffers from the disadvantage that the perforations can only be formed in the cigarette during half a rotation of the cigarette about its own axis. In that state of the art, therefore, the cigarette is completely perforated by means of the laser beam. It is only in that way that perforation of the entire periphery of the cigarette can be effected in the rolling passage. Piercing the cigarette as a whole in that way however is often not desirable in production of the cigarette as it has adverse effects on the quality of the cigarettes produced.

SUMMARY OF THE INVENTION

Therefore, the object of the present invention is to avoid the above-mentioned disadvantages which occur in the state of the art, and to provide a perforating apparatus a minimum level of technical complication and expenditure, and without requiring complicated synchronization makes it possible to perforate the entire periphery of the elongate, cylindrical objects, in particular cigarettes, in a cost effective manner. In that respect, the invention further seeks to ensure that the forces acting on the objects during the perforating operation, in particular forces due to the rolling means, are kept as low as possible.

In a perforating apparatus of the kind set forth in the opening part of this specification, the foregoing object is attained in accordance with the invention in that there is provided a stationary light-refracting means through which the light beam serving for perforation is passed before reaching the actual operative zone, so that, when the light beam is caused to track the object which is passing through the operative zone, the light beam remains focused substantially everywhere within the operative zone.

The advantages of the invention are in particular that the light-refracting means according to the invention makes it possible to eliminate complicated and expensive mirror structures and complicated and expensive rotating mirrors. By virtue of the invention, it is sufficient to have a stationary light-refracting means through which the light beam passes before reaching the operative zone and through which the light beam passes during the complete movement of the light beam by virtue of the guidance tracking means through the operative zone.

In accordance with the invention, it is particularly advantageous if the light refracting means is a focus-corrected lens (F-theta lens). The invention can be carried into effect in a particularly simple fashion by means of such a lens. A lens of that kind can be arranged preferably with its main plane parallel to the path of transportation movement of the objects to be perforated, in such a way that the lens lies in the path of the light beam to the operative zone, throughout the entire guidance tracking region of the light beam. In that case, the focus-corrected lens (F-theta lens) ensures that the light beam, and in particular a laser beam, passes onto the object or on the peripheral surface of the object to be perforated, in a condition of being focused by the lens at each respective location within the operative zone, throughout the entire guidance tracking movement for covering the operative zone.

That is due to the fact that the focus-corrected lens (F-theta lens) has the same focal distance available over its entire width along the main plane. In the case of a lens of that kind therefore, the light beam or laser beam can be displaced over the main plane, without the focal distance and thus the focus of the laser beam that passes through such a lens being changed. Therefore, by means of such a lens, the laser beam can be caused to follow the object that moves with a rolling motion on the transverse conveyor, without the laser beam being de-focused.

Lenses that afford the above-mentioned advantages of the invention can be obtained for example from the company Laser Components GmbH of Olching, Germany. In that respect, planoconvex lenses, meniscus F-theta planar field lenses and spherical ZnSe-F-theta planar field lenses, which are products offered by that company, are particularly advantageous.

In a particularly preferred embodiment of the invention the transport means is in the form of a transverse conveyor. In embodiments of the invention, the transverse conveyor can be in the form of a belt conveyor or in the form of a rolling drum. The transverse conveyor conveys the objects to be perforated, in particular cigarettes, with their longitudinal axes disposed transversely with respect to the direction of conveying movement.

The objects to be perforated are moved into the operative zone of the light beam by means of such a transverse conveyor. Then, within the operative zone of the laser beam, which is produced by the light beam guidance tracking means, the perforations or openings can be formed in the peripheral surface of the object that moves in axially transverse relationship through the operative zone. While the object is moving through the operative zone, the light beam and in particular the laser beam is caused to follow it by means of the guidance tracking means which are preferably in the form of pivotal mirrors. It is therefore ensured that the objects to be perforated are engaged by the light source during the entire period for which they are in the operative zone, so that during the entire period for which the objects are in the operative zone, perforations can be formed in the peripheral surface of the object.

If now perforations are to be formed in the object over the entire periphery thereof, then the object must be rotated while it is moving through the operative zone. That is achieved by means of the above-mentioned rolling means. The rolling means cause the object to perform a rotary movement about its own axis. In a preferred embodiment of the invention, the rolling means is in the form of a co-operating counterpart rolling surface which is disposed opposite to the transverse conveyor. That counterpart rolling surface can be in the form of a counterpart rolling belt or in the form of a counterpart rolling drum. In such an arrangement, the directions of conveying movement of the counterpart rolling surface and the transverse conveyor can be opposite or in the same direction. When the counterpart rolling surface involves a conveying movement component in the same direction, the object to be perforated is accelerated in the rolling motion, in the area in which the transverse conveyor and the counterpart rolling surface co-operate. When the counterpart rolling surface and the transverse conveyor involve conveying movement components in opposite directions, the object to be perforated is retarded or slowed down in the area in which the transverse conveyor and the counterpart rolling surface co-operate. In both cases however, the object is caused to perform a rolling movement on the transverse conveyor. That rolling movement can occur stationarily relative to the transverse conveyor in a recess provided for the object. The rolling movement however can also be produced in a rolling region which is provided for that purpose on the transverse conveyor. In the latter case, it is preferred if raised portions on the transverse conveyor respectively delimit the rolling region provided on the transverse conveyor. In that way, at the moment of co-operation of the counterpart rolling surface and the transverse conveyor, the object to be perforated moves from one raised portion defining the rolling surface to the other. When, in such an embodiment, the entire periphery of the object to be perforated is perforated, the object is moved between the two raised portions once about its axis. In that case, the light beam or laser beam for perforating the object is then caused to follow the object corresponding to the movement of the object over the rolling surface at the transverse conveyor in order to perforate the object entirely around its periphery.

In another preferred embodiment of the invention, the objects to be perforated are disposed in a stationary manner, relative to the transverse conveyor, in openings or recesses in the transverse conveyor. The rolling means is formed not just by a counterpart rolling surface—as described hereinbefore—but there is also provided a further rolling surface in opposite relationship to the counterpart rolling surface. The further rolling surface can also be in the form of a rolling belt or rolling drum. That second rolling surface engages the objects to be perforated, in the operative zone, that is to say in the area of co-operation between the counterpart rolling surface and the transverse conveyor, from the side which is opposite to the counterpart rolling surface. This embodiment therefore involves a co-operation in the operative zone as between the counterpart rolling surface and the rolling surface. In that respect, it is particularly preferred if the rolling surface has a conveyor movement component which is opposite to that of the transverse conveyor while the counterpart rolling surface has a conveying movement component which is in the same direction as the transverse conveyor. In that way, the object to be perforated and in particular the cigarette is acted upon in the operative zone by respective oppositely directed conveyor forces in diametrically opposite relationship so that the cigarette is turned in the opening or recess on the transverse conveyor.

A further preferred embodiment of the present invention is distinguished in that the rolling means is an integral component of the transport means. With this embodiment, it is further preferred if the transport means is a transverse conveyor on which the objects are conveyed in axially transverse relationship, wherein the transverse conveyor has receiving means for receiving the objects. In this embodiment, these receiving means are preferably distinguished in that they are rotatable for producing the rotary movement of the objects about their own longitudinal axis. In this case, the receiving means are preferably in the form of troughs or depressions which are preferably subjected to the action of suction air in order to hold the objects in the troughs, even during the rotary movement of the troughs or the objects about their axis. The advantages of this embodiment are in particular that each individual object can be precisely rotated, by means of this structure. In this embodiment, therefore, no serious inaccuracies are involved in the rotary movement of the object. In this way, therefore, by virtue of this construction, the perforations can be formed in the objects precisely at accurately predeterminable points. This embodiment further has the advantage that, due to the fact that each object is disposed in its own receiving means, there is no possibility whatsoever of the objects interacting with each other, so that this embodiment is distinguished by a particularly high degree of reliability.

In a further preferred embodiment of the invention, the above-mentioned receiving means are mounted rotatably directly on a transport drum. In this arrangement, the objects are preferably transferred from a feed conveyor drum directly to the transport drum, passed through the operative zone of the light beam, and transferred directly from the transport drum to a discharge conveyor drum or another working device. In this way, by means of this embodiment, the roller of the transport means can be optimally combined with that of the rolling means so that this arrangement overall also provides for a reduction in the structural length of a perforation apparatus of such a design configuration. Applicants: Manfred Dombek, et al.

In a further preferred embodiment of the present invention, the transport drum has a given pitch spacing or division, wherein the objects are rotatable once about their axis within a rotational movement of the transport drum through one pitch division. In that way, the complete perforation can be produced within the rotational movement of the rotary drum through one pitch division. As a result, the necessary laser beam tracking movement is also reduced to a necessary minimum.

This embodiment is advantageous because when the light source acts on the objects to be perforated, from the interior of the transport drum, the light source also has, during the tracking movement of the light beam, a light path between itself and the objects, which remains approximately the same, as the objects are moved on a circular trajectory.

A further preferred embodiment of the invention has, along the periphery of the transport drum, two rows of receiving means which are disposed in mutually opposite mirror-image relationship, at a given pitch spacing relative to each other. In this way, it is advantageously possible simultaneously to perforate double the number of objects if the light source is also divided, for example, by a beam splitter or if the arrangement has two light sources.

A further preferred embodiment of the invention is shown in which each two receiving means are disposed in mirror-image opposite relationship and a rotatable by means of rotating means. In this embodiment, the rotating means respectively include pinions which are fixed to the receiving means, the pinions respectively meshing with a gear arranged on a common drive shaft. In this way, the drive for two oppositely disposed receiving means is advantageously effected by a single drive shaft.

With this embodiment, it is further preferred if the drive shaft is drivable by a control means which is arranged at one of the end insides of the transport drum and which by way of a gear drives a pinion on the drive shaft. This embodiment is also advantageously distinguished by virtue of being of a small structural size, insofar as the control means are also disposed within the transport drum. In that case, it is further preferred if the control means is a lever guided in a stationary control cam, the control cam further preferably being in the form of a U-shaped groove in one of the end wall insides of the transport drum. It is advantageously possible, by means of such a U-shaped groove, for the lever serving as the control means to be precisely guided at any time.

In a further preferred embodiment of the present invention, the above-mentioned receiving means of the row thereof, which are adjacent along the periphery of the transport means, are each provided with their own respective rotating means or drive means. In that case, it is further preferred if receiving means which are in adjacent relationship along the periphery of the transport drum each have their own control means. Thus, in this embodiment, each receiving means which is adjacent along the periphery is advantageously moved separately from each other and in a controlled and deliberate fashion.

A further preferred embodiment of the invention is distinguished in that the receiving means are rotatable by the rotating means, in such a way that the rotary movement of the objects about their longitudinal axis occurs at least during the movement of the objects through the operative zone. In this case, it is further preferred if the rotary movement of the objects takes place substantially only during the movement of the objects through the operative zone. In this way, the objects are loaded by the rotary movement, only during their movement through the operative zone. In that respect, it is further preferred if the rotary movement of the objects about their longitudinal axis takes place uniformly, that is to say preferably at a steady angular speed, during the movement of the objects through the operative zone. In this way, the objects can be rotated through 360° at a constant rotary speed during their movement through the operative zone, and they can then be brought to a halt again. In that respect, it is further preferred if the objects can be accelerated to the necessary rotary speed before reaching the operative zone and can be decelerated again to their rest condition after reaching the end of the operative zone. In this case, the acceleration and deceleration movements preferably take place substantially linearly.

Further preferred embodiments of the invention are set forth in the appendant claims.

BRIEF DESCRIPTION OF THE DRAWINGS

A number of embodiments by way of example of the invention will now also be described with reference to the accompanying drawings in which:

FIG. 1 is a partly cross-sectional view with diagrammatic components, illustrating a perforating apparatus with transport means in the form of a rolling drum, FIG. 2 is a view in section A—A through the perforating apparatus of FIG. 1, FIG. 23 shows the section of FIG. 22, including the laser tracking and focusing devices illustrated at the top in FIG. 19.

DETAILED DESCRIPTION OF THE DRAWINGS

Figure 4:
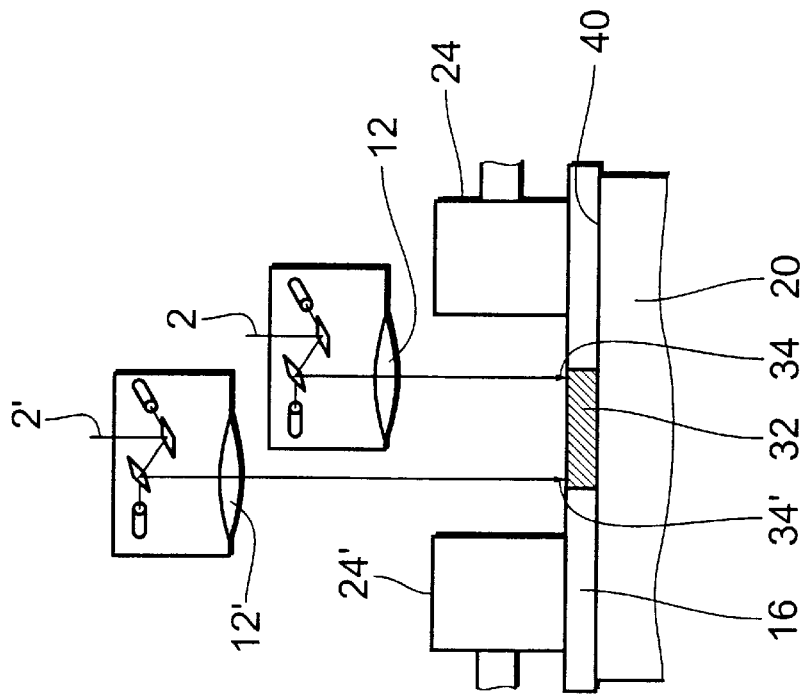
FIG. 4 shows a section B—B through the perforating apparatus of FIG. 3.

FIG. 1 shows a perforating apparatus 1. The perforating apparatus 1 has a laser (not shown) as a light source. The laser emits a high-energy light beam in the form of a laser beam 2, which is pulsed synchronously with respect to the speed of the machine. The laser beam 2 passes by way of a first pivoting mirror 4 to a pivoting mirror 6 and from there towards the objects 16 to be perforated. A drive motor 8 moves the first pivoting mirror 4. A drive motor 10 moves the second pivoting mirror 6. The first pivoting mirror 4 serves to pivot the laser beam 2 along the longitudinal axis of the objects 16 to be perforated, and thus to adjust the location of the perforations or to adapt that location to the nature of the objects, in particular the length thereof. The pivoting mirror 6 serves as a guidance tracking means for tracking guidance of the laser beam 2 in order to produce for the laser beam 2 an operative zone within which the laser beam 2 can produce the openings (not shown) on an object 16 as it moves through the operative zone. In FIG. 1, the extent of the operative zone in the direction of movement of the objects 16 is illustrated by the laser beam 2a shown in solid line and the laser beam 2b shown in broken line. In other words, the pivoting mirror 6 can pivot the laser beam 2 between the extreme positions 2a and 2b in order to cause the laser beam 2 to track and follow the object as it moves.

After reflection of the laser beam 2 by the second pivoting mirror 6, the laser beam 2 impinges on a focus-corrected lens (F-theta lens) 12. The laser beam 2 is focused by the F-theta lens 12 in such a way that it is focused on the objects to be perforated, at the impingement points indicated by lead lines 14a and 14b respectively, in such a way that the laser beam can perforate the desired diameters of the openings in sheathing or casing of the objects 16.

The objects 16 to be perforated in FIG. 1 are double filter cigarettes 16. The double filter cigarettes 16 are conveyed into the operative zone of the laser beam 2 by a rolling drum 20 which rotates in a support frame structure 18. In this arrangement, the rolling drum 20 rotates in the counter-clockwise direction, as shown in FIG. 1.

When, due to the rotary movement of the rolling drum 20, the double filter cigarettes 16 reach the extreme impingement point 14a of the laser beam 2a, which is shown entirely at the right in FIG. 1, [then] they are engaged from above in FIG. 1 by a co-operating counterpart rolling belt 24 which has a counterpart rolling surface 23 and which serves as a rolling means for producing a rotary movement of the double filter cigarettes 16 about their own axis. At the impingement point 14a, the counterpart rolling belt 24 is moving in the same direction of conveying movement as the rolling drum 20. At the same time, the double filter cigarettes 16 are engaged from below in FIG. 1 by a rolling surface 26 which also serves as a rolling means. The rolling surface 26 is provided on a rolling block 28. The rolling surface 26 extends parallel to the counterpart rolling surface 23.

In order now to roll the double filter cigarette 16, the counterpart rolling belt 24 moves at a higher speed of conveying movement than the rolling drum 20. In this way, the double filter cigarette 16 which has arrived at the point 14a, is caused to rotate about its longitudinal axis by the rolling surface 26 and the counterpart rolling surface 23 between points 14a and 14b.

Moreover, by virtue of the higher speed of conveying movement of the counterpart rolling belt 24 with respect to the rolling drum 20, the double filter cigarette 16 also moves from the flank 21 of the raised portion 22, to the oppositely disposed flank 30 of the raised portion 22 which is next in the direction of conveying movement of the rolling drum 20. The double filter cigarette 16 reaches the position at the opposite flank 30 precisely at the moment in time at which it reaches the other extreme end of the operative zone, more specifically the point 14b. In the meantime, the double filter cigarette 16 has performed a complete revolution once about its own axis, in the operative zone between the points 14a and 14b. While this is happening, the laser beam 2 has moved with a tracking motion from the extreme position 2a (impingement point 14a) to the extreme position 2b (impingement point 14b) by means of the second pivoting mirror 6 to follow the movement of the double filter cigarette 16, by virtue of synchronization means (not shown). Throughout the tracking movement of the laser beam 2 by means of the pivoting mirror 6, the laser beam 2 remains constantly focused by the focusing corrected lens (F-theta lens) in the plane of the counterpart rolling surface 23, at the desired size of the opening in the casing or sheathing of the objects 16. In this way, the perforating apparatus 1 shown in FIG. 1 can produce a perforation which extends around the entire periphery of the double filter cigarette 16 in the sheathing or casing thereof.

By means of the first pivoting mirror 4, driven by the pivoting motor 8, the laser beam 2 can also be displaced parallel to the longitudinal axis of the double filter cigarettes 16. The position of the impingement point 14a on the object 16 to be perforated thus can be displaced perpendicularly to the plane of the drawing as shown in FIG. 1. The pivoting mirror 4 therefore serves to adjust the location of the perforation on the object 16.

In addition, if necessary, two or more parallel lines of perforations can be provided on the object 16 or the casing or sheathing thereof, around the periphery thereof. In this case, the laser beam (not shown) can also be varied in terms of its output power, in such a way that, when the laser beam impinges on the object 16 to be perforated, the laser beam 2 entirely passes through the object 16 so that holes which extend through the object 16 can be formed therein.

In another embodiment (not shown) the laser can be switched off so that the object 16 is perforated only over a part of its periphery.

In the extreme position 14b shown at the left in FIG. 1, the double filter cigarette 16 which is then perforated leaves the operative zone of the laser beam 2, which is between the points 14a and 14b, or the rolling passage which is between the points 14a and 14b and which is defined between the surfaces 23 and 26, so that the cigarette 16 can be further transported by the transverse conveyor which is in the form of the rolling drum 20. In that further transportation movement, the double filter cigarette 16, just as it was held at the first flank 21, is also held fast to the peripheral surface of the rolling drum 20 at the oppositely disposed flank 30, by a suction means (not shown).

FIG. 2 shows a section through the perforating apparatus in FIG. 1 taken along line A—A. The same references denote the same components. The sectional view illustrates a double filter cigarette 16 while it is in the operative zone between the points 14a and 14b in FIG. 1. As usual, the double filter cigarette 16 is disposed with the filter portion 32 in the centre in the rolling passage which is formed by the counterpart rolling belts 24 and 24' and the rolling blocks 28 and 28' (references with a prime denote the same components which however are present in duplicate). As shown in FIG. 2, the filter portion 32 is subjected to the action of two laser beams 2 and 2'. In this arrangement, each laser beam 2, 2' passes through respective focus-corrected lenses (F-theta lenses) 12, 12'. The impingement points 34 and 34' of the laser beams 2, 2' on the double filter cigarette 16 or on the filter portion 32 are so selected that those impingement points 34, 34' are in the end of the filter portion 32, which is the end that is towards the respective tobacco-containing portion 36', respectively, of the double filter cigarette 16. In this arrangement, the position of the impingement points 34, 34' can be displaced along the longitudinal axis of the double filter cigarette 16 as indicated by the arrows 38, 38' shown in FIG. 2, by means of the pivoting mirrors 4, 4'.

Figure 3:
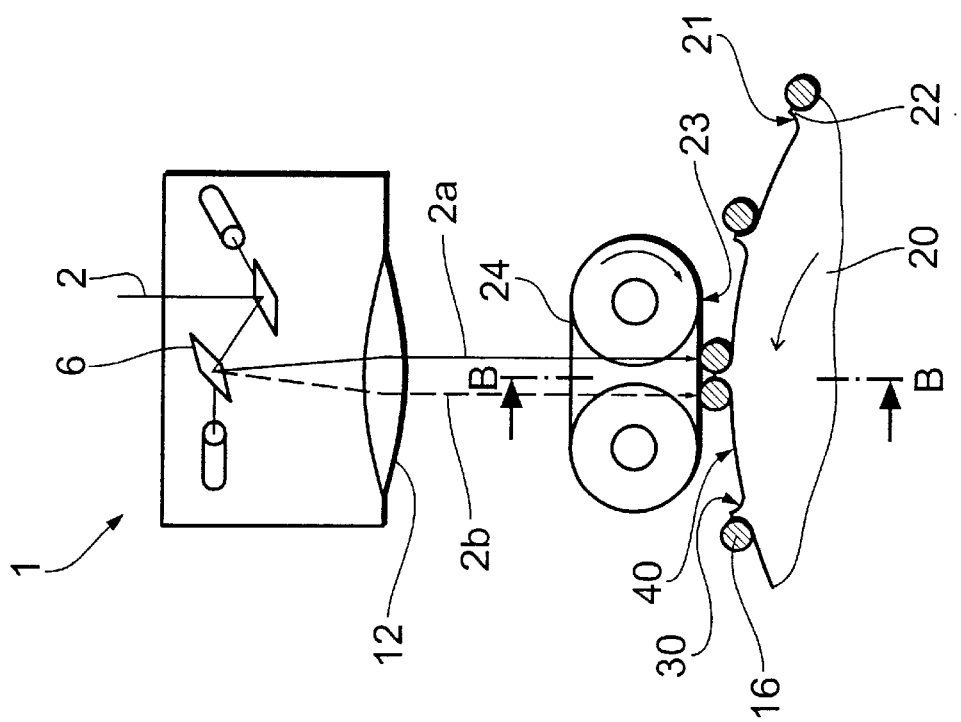
FIG. 3 shows a partly cross-sectional view with a diagrammatic part of a second embodiment of a perforating apparatus with rolling means in the form of a rolling drum.

FIG. 3 also shows another embodiment of a perforating apparatus 1. In this case also, the same components are denoted by the same references. This perforating apparatus 1 also has a rolling drum 20 with a series of raised portions 22. The region between the raised portions 22 is however in the form of a rolling portion 40. Accordingly, in the perforating apparatus 1 shown in FIG. 3, the double filter cigarette 16 to be perforated can be rolled with the assistance of the rolling portion 40 acting as a rolling surface and the counterpart rolling surface 23 of the counterpart rolling belt 24. Unlike the rolling effect in the embodiment shown in FIG. 1 however, in the embodiment of FIG. 3 the speed of conveying movement of the rolling drum 20 is selected to be higher than that of the counterpart rolling belt 24. The counterpart rolling belt 24 therefore retards or decelerates the double filter cigarette 16 which in this embodiment bears against the oppositely disposed flank, so that the double filter cigarette 16 rolls back relative to the rolling drum 20 over the rolling portion 40 on the rolling drum 20, so that finally the double filter cigarette 16 comes to bear against the flank 21 of the raised portion 22, which is the leading flank in the direction of conveying movement of the rolling drum 20. In this embodiment also, the double filter cigarettes 16 are held against the respective flanks 21, 30 of the raised portions 22 by means of suction openings or the like.

The double filter cigarette 16 however moves rearwardly only relative to the rolling drum 20 or the rolling portion 40. In regard to its position in space however, it moves forwardly—even if at a reduced speed—so that in this embodiment also the laser beam 2 must be trackingly guided by pivoting mirror 6 from a position 2a marking the initial position of the operative zone to a position 2b marking the end position of the operative zone. It will be noted that, in this embodiment, the operative zone, that is to say the region in which the laser beam 2 is displaced with a guided tracking movement, is considerably shorter than in the embodiment illustrated in FIG. 1.

FIG. 4 shows a section of the embodiment of FIG. 3 along line B—B. In this case also the same components are denoted by the same references. In this embodiment also, just as in the embodiment of FIGS. 1 and 2, impingement points 34 and 34' of the laser beams 2 and 2' are provided at the respective ends of the filter portion 32, so that in this case also perforated lines or chains of perforation openings can be formed in the filter casing or sheathing of the double filter cigarette 16, at the respective ends of the filter portion 32. It will be seen from FIG. 4 that the rolling portion 40 extends almost over the entire length of the double filter cigarette 16. The counterpart rolling belts 24 and 24' respectively which then together with the rolling portion 40 form the rolling passage for the double filter cigarette 16 are unchanged, in comparison with the embodiment of FIGS. 1 and 2.

Figure 5:
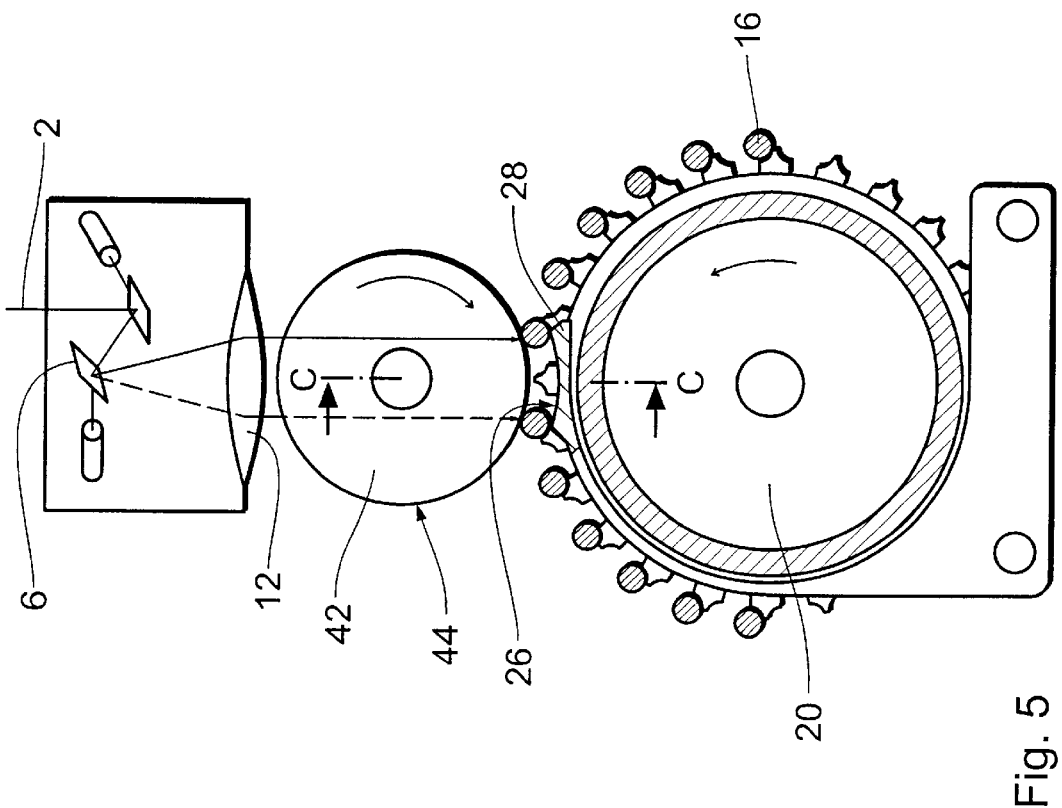
FIG. 5 shows a partly cross-sectional view with a diagrammatic part through a third embodiment of a perforating apparatus according to the invention with transport means in the form of a rolling drum.

FIG. 5 shows a further embodiment of a perforating apparatus 1 according to the invention. In this case also, the same components are denoted by the same references. The particularity with this embodiment is that the objects to be perforated are not rolled between a surface of a rolling block 28 and an oppositely disposed counterpart rolling belt 24, as is the case in the embodiments of FIGS. 1 to 4, but in this embodiment of FIG. 5 the double filter cigarette 16 is rolled between a rolling block 28 and a counterpart rolling drum 42. As a rolling drum 42 does not have any flat surfaces, the rolling block 28 or its surface 26 is curved in such a way as to correspond to the curvature of the surface 44 of the counterpart rolling drum 42. In this case also therefore, as can also be seen from FIG. 6, a rolling passage is formed between the surface 26 of the rolling block 28 and the surface 44 of the counterpart rolling drum 42.

In this embodiment also, as in the embodiment of FIGS. 1 and 2, the counterpart rolling drum 42 moves at a higher speed of conveying movement than the rolling drum 20. Accordingly, in this case also, the double filter cigarette 16 is rolled forwardly by the counterpart rolling drum 42 in the direction of conveying movement on the rolling surface 26 of the rolling block 28. In this case also, the laser beam 2 is guided by the pivoting mirror 6 to follow the movement of the rolling double filter cigarette 16 through the rolling passage formed by the surfaces 26 and 44.

Figure 6:
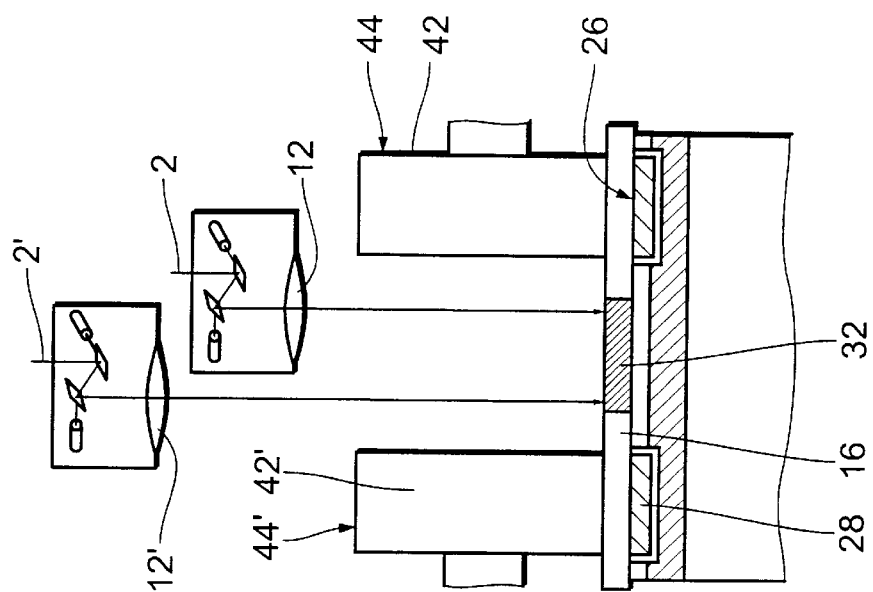
FIG. 6 shows a section C—C through the perforating apparatus of FIG. 5.

As shown in FIG. 6, this embodiment also has two lasers which form two perforated lines in the filter portion 32, with their laser beams 2, 2'.

Figure 7:
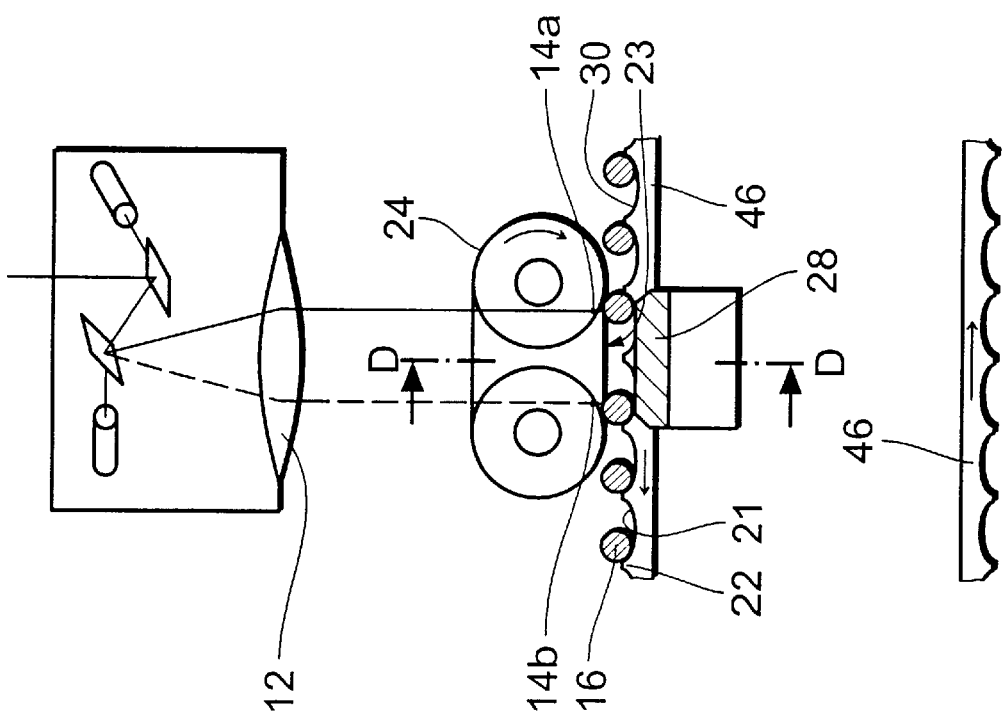
FIG. 7 shows a partly cross-sectional view with a diagrammatic part through a fourth embodiment of the perforating apparatus according to the invention, in which the transport means are in the form of a conveyor belt.

FIG. 7 shows a further embodiment of the perforating apparatus according to the invention. In this perforating apparatus I the double filter cigarettes 16 (in this case also, the same components are denoted by the same references) are conveyed in axially transverse relationship by a transverse conveyor in the form of a belt conveyor 46. As is also the case with the embodiment of FIGS. 1 and 2, this embodiment has a counterpart rolling belt 24 with a counterpart rolling surface 23. The counterpart rolling surface 23 co-operates with a rolling block 28 which is also provided here, or more specifically the rolling surface 26 thereof, to provide a rolling passage for the double filter cigarettes 16 to be perforated. In this embodiment also, the speed of conveying movement of the counterpart rolling belt 24 is higher than that of the belt conveyor 46 so that, on reaching the operative zone at the point 14a, the double filter cigarettes 16 are rolled in the forward direction over the rolling block 28 from the first flank 21 of the raised portions 22 to the oppositely disposed flank 30 of the raised portions 22. In this case also, the double filter cigarettes 16 are retained in their positions on the flanks 21 and 30 by means of suction holes (not shown).

Figure 8:
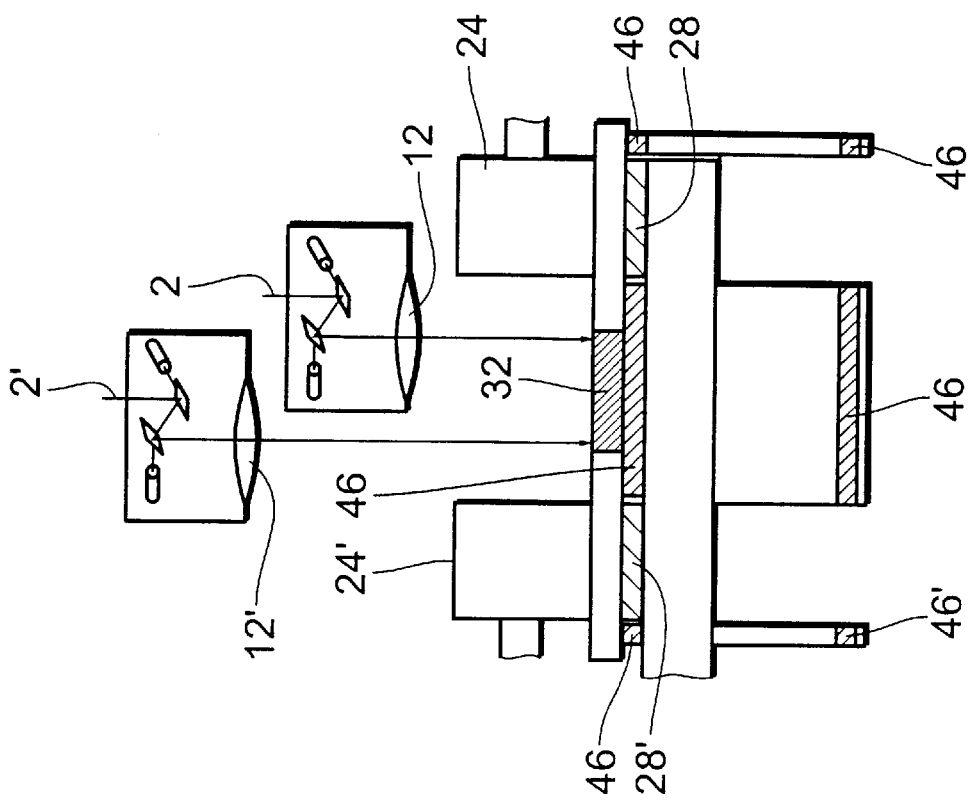
FIG. 8 shows a section D—D through the perforating apparatus of FIG. 7.

FIG. 8 shows a section taken along line D-D in FIG. 7. It will be seen that, in the condition shown in FIG. 8, the conveyor belt 46 is out of contact with the double filter cigarette 16 because it is in the rolling passage formed by the rolling blocks 28, 28' and the counterpart rolling belts 24, 24'.

Figure 9:
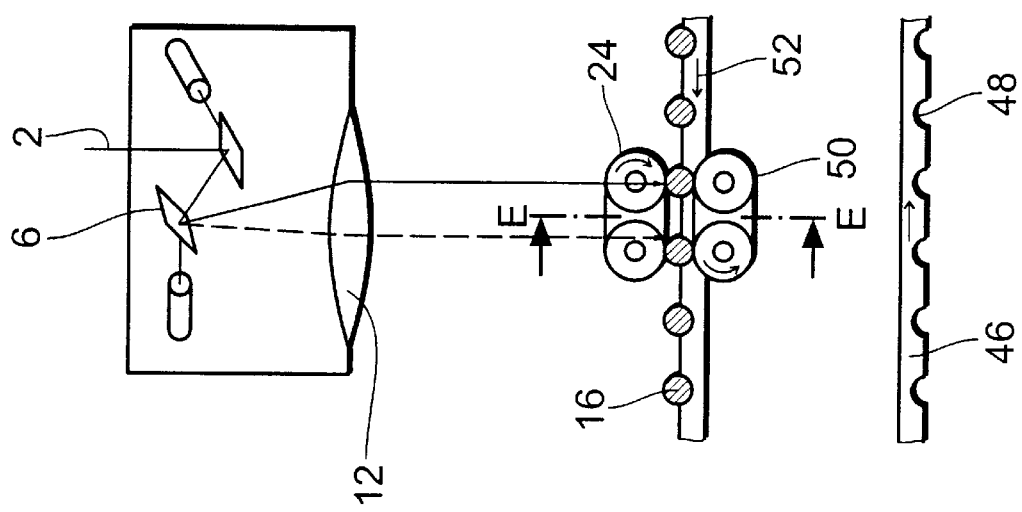
FIG. 9 shows a partly cross-sectional view with a diagrammatic part through a fifth embodiment of the perforating apparatus according to the invention, in which the transport means are in the form of belt conveyors.

FIG. 9 shows yet a further embodiment of a perforating apparatus according to the invention. As in the embodiment of FIGS. 7 and 8, this embodiment has a belt conveyor 46. The particularity with this embodiment is that the double filter cigarettes 16 are disposed lying in openings or recesses 48 in the belt conveyor 46. In the rolling passage therefore, the double filter cigarettes 16 are rolled on the spot relative to the belt conveyor 46 with an unchanged conveying movement component. In this embodiment, the rolling passage is formed not only by a counterpart rolling belt 24 but also by a rolling belt 50 which is disposed opposite the counterpart rolling belt 24, or between the respective surfaces thereof. In this arrangement, as also in the case of the preceding embodiments with counterpart rolling belts, the counterpart rolling belt 24 moves with a direction of conveying movement which within the operative zone corresponds to the direction 52 of conveying movement of the belt conveyor 46. In comparison, the rolling belt 50 moves with a direction of conveying movement which within the operative zone is opposite to the direction 52 of conveying movement of the belt conveyor 46. In the embodiment of FIG. 9 therefore, the double filter cigarettes 16 are rolled in the counter-clockwise direction, in their condition of lying in the recesses 48. During that rolling movement which is stationary relative to the belt conveyor 46, the double filter cigarettes 16 move through the rolling passage between the belts 24 and 50 at the speed 52 of conveying movement of the belt conveyor 46. The laser beam 2 therefore must be caused to perform its tracking movement by means of the pivoting mirror 6 synchronously with respect to the movement of the double filter cigarettes 16 at the conveying speed 52, in order to provide for perforation over the entire periphery of the double filter cigarettes 16.

Figure 10:
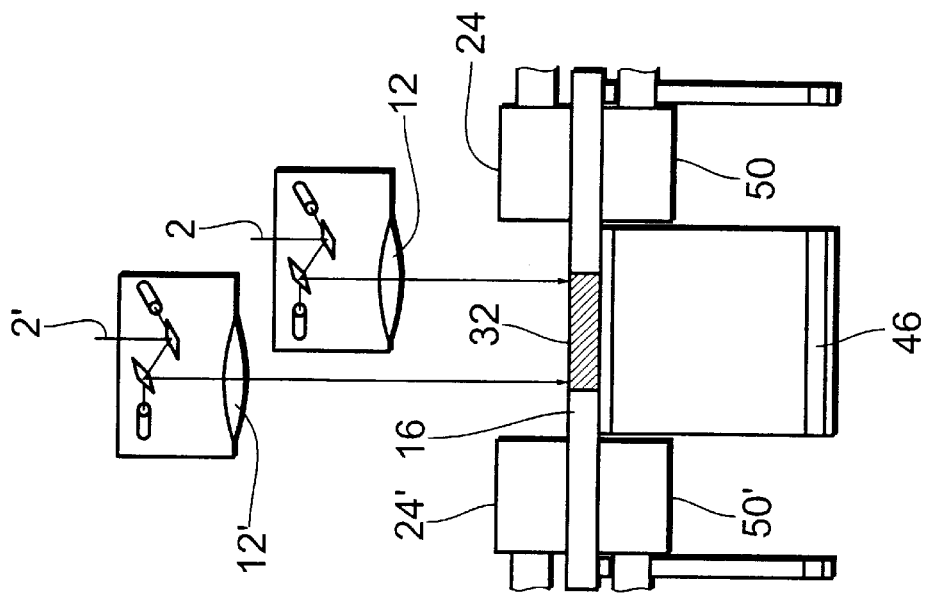
FIG. 10 shows a section E—E through the perforating apparatus of FIG. 9.

FIG. 10 shows a section taken along line E-E through the embodiment of FIG. 9. On both sides of the belt conveyor 46, FIG. 10 shows the respective counterpart rolling belts 24, 24' and rolling belts 50, 50'. This embodiment also has two laser beams 2, 2' in order to form the respective lines of perforations at each of the ends of the filter portion 32.

Figure 11:
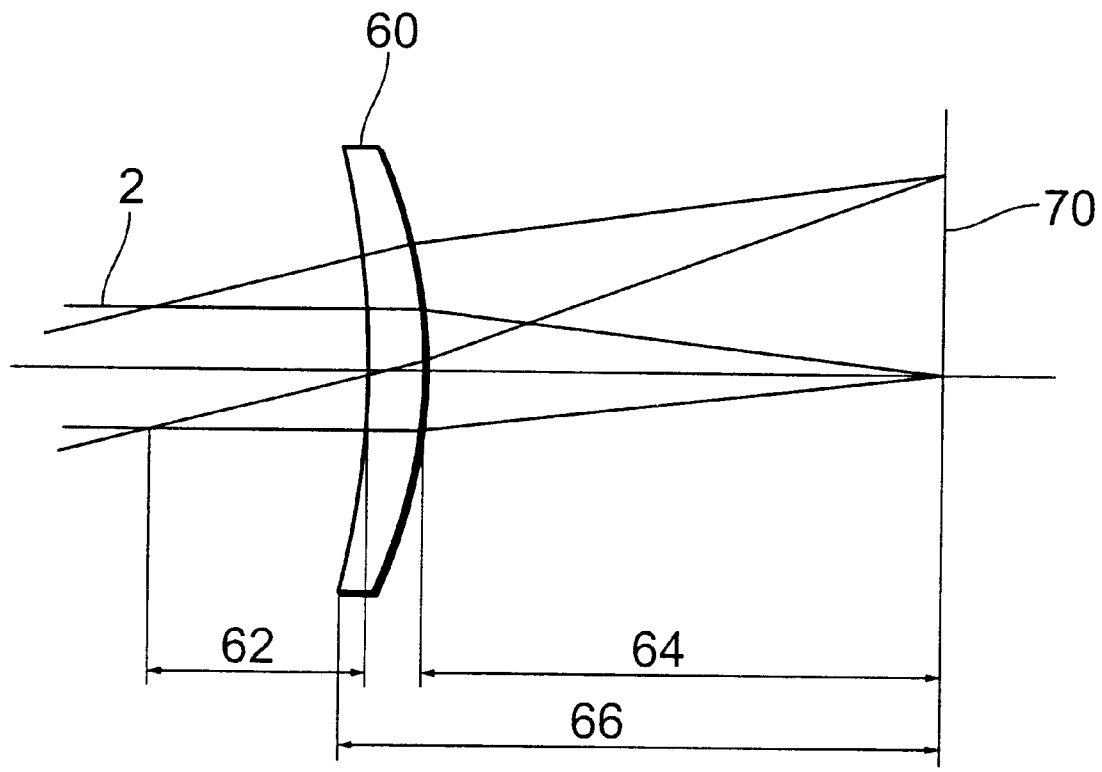
FIG. 11 shows a diagrammatic view of a F-theta lens used in the invention, with a diagrammatic beam path.

FIG. 11 is a diagrammatic view of a spherical meniscus F-theta planar field lens 60 which can be used for the perforating apparatus 1 according to the invention. FIG. 11 shows a side view of the lens 60. The lens 60 has an entrance pupil 62, a working distance 64 and a focal distance or length 66. Reference 70 identifies the working surface which, in the perforating apparatuses 1 shown in the foregoing Figures, is the surface of the double filter cigarette 16 to be perforated. As can be seen from FIG. 11, the laser beam 2 remains focused, even if it impinges on the spherical F-theta planar field lens 60 from various directions. The same applies (not shown) for parallel displacement of the laser beam 2.

Figure 12:
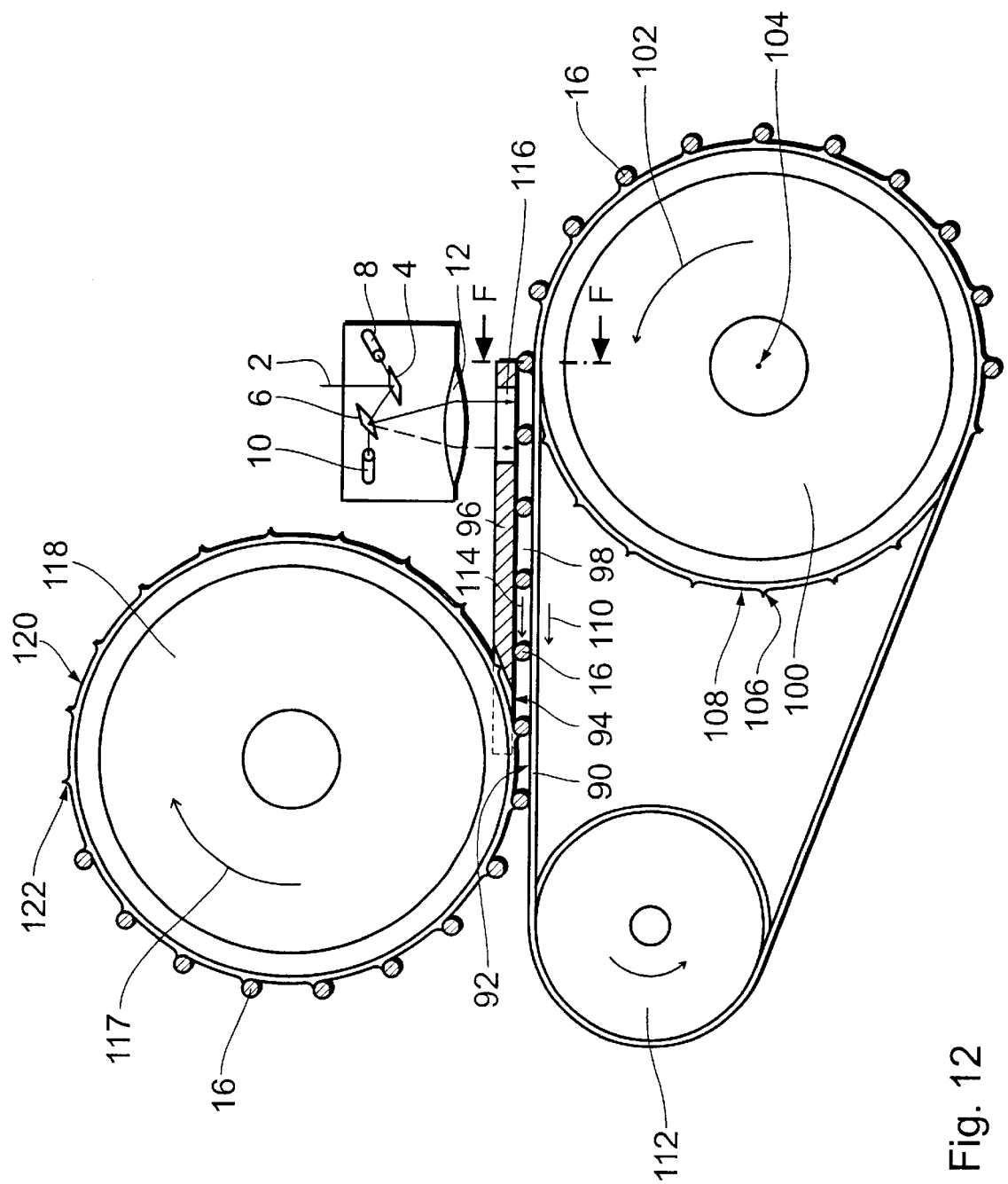
FIG. 12 shows a partly cross-sectional view with a diagrammatic part through a sixth embodiment of the perforating apparatus according to the invention, in which the transport means is in the form of a rolling belt.

FIG. 12 shows a sixth embodiment of the perforating apparatus according to the invention. In FIG. 12 parts which are substantially the same as parts in the preceding Figures have been denoted by the same references. The embodiment of FIG. 12 differs from the above-described embodiments in that the functions of the transport means for transporting the double filter cigarettes through the operative zone, and a feed conveyor means, are separated. In the embodiment of FIG. 12, a rolling belt 90 serves as the transport means. With its surface the rolling belt 90 forms a rolling surface 92 for the double filter cigarette 16 to be rolled. The rolling surface 92 co-operates with a counterpart rolling surface 94. The counterpart rolling surface 94 is formed by the underside of a rolling block 96 which is arranged parallel to the rolling belt 90. The rolling surface 92 and the counterpart rolling surface 94 together form a rolling passage 98.

The double filter cigarettes 16 are fed to the rolling passage 98 by a feed conveyor drum 100. The feed conveyor drum 100 rotates about the axis 104, as indicated by the arrow 102, and carries the double filter cigarettes 16 in an axially transverse relationship with respect to the direction 114 of conveying movement in recesses or troughs 106 provided on the peripheral surface 108 of the conveyor drum 100.

Figure 13:
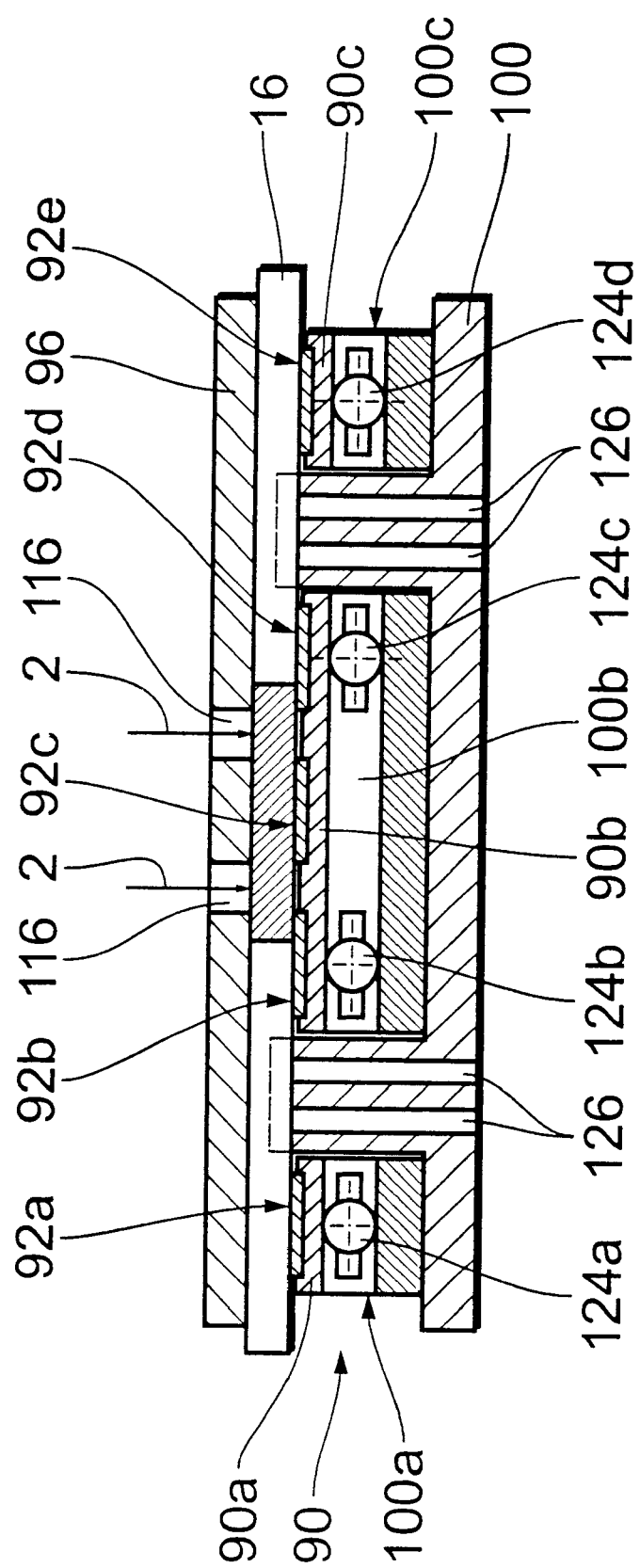
FIG. 13 shows a section F—F through the perforating apparatus of FIG. 12.

The double filter cigarettes 16 are sucked into the troughs 106 by suction ducts 126 (shown in FIG. 13). At the location identified by the section line F-F in FIG. 12, the rolling surface 92 of the rolling belt 90 comes into contact with the double filter cigarettes 16 in the recesses 106. At the same time, the double filter cigarettes 16 come into contact with the counterpart rolling surface 94 of the rolling block 96. That location therefore marks the beginning of the rolling passage 98 and the beginning of the rolling movement of the double filter cigarettes 16 in the rolling passage 98. The speed of conveying movement of the double filter cigarettes 16 in the rolling passage 98 is determined by the speed of the rolling belt 90, which is symbolically indicated by the arrow 110. That speed is so selected in FIG. 12 that the pitch distance or division of the double filter cigarettes 16 in the rolling passage corresponds to the pitch distance or division of the double filter cigarettes 16 on the peripheral surface 108 of the feed conveyor drum 100. Since, as shown in FIG. 12, when the rolling belt 90 wraps around the feed conveyor drum 100, the rolling surface 92 of the rolling belt 90 is aligned with the peripheral surface 108 of the feed conveyor drum 100 and the rolling belt 90 at the same time rotates around the axis 104 coaxially with the feed conveyor drum 100, the rolling belt 90 moves at double the peripheral speed, compared to the peripheral speed of the rolling drum 100. Downstream of the rolling passage 98, the rolling belt 90 passes around a direction-changing drum 112 from which it is guided back to the feed conveyor drum 100.

At the beginning of the rolling passage 98, as viewed in the direction of conveying movement of the double filter cigarettes 16, openings 116 are provided in the rolling block 96, with the openings 116 extending parallel to the direction of conveying movement 114. The laser beam 2 can act on the double filter cigarettes 16 through the openings 116, and perforate the cigarettes 16 while they are moving in the operative zone defined by the openings 116. For that purpose, as was described in detail with reference to the above-discussed embodiments, the laser beam 2 is displaced by means of the pivoting mirror 6 to track the conveying movement 114 of the double filter cigarettes 16 in the rolling passage 98 within the operative zones defined by the openings 116.

The double filter cigarettes 16 which are perforated in this way then reach the end of the rolling passage 98 where they are engaged by a discharge conveyor drum 118 which rotates in the direction indicated by the arrow 117. For this purpose, the discharge conveyor drum 118 also has, on its peripheral surface 120, troughs 122 for receiving the perforated double filter cigarettes 16.

FIG. 13 is a view in section through the embodiment of FIG. 12 taken along line F—F. FIG. 13 clearly shows the double filter cigarette 16 which is disposed at the beginning of the rolling passage 98. Parts which are identical to those in FIG. 12 are denoted by the same reference numerals in FIG. 13.

The double filter cigarette 16 is disposed between the rolling block 96 and rolling belt 90. FIG. 13 shows that the rolling belt 90 comprises three portions 90a, 90b and 90c. The rolling surface 92 of the rolling belt 90, which is towards the double filter cigarette 16, is divided once again on the central portion 90b of the rolling belt 90 so that in total there are five surface portions 92a, 92b, 92c, 92d and 92e.

The portions 90a, 90b and 90c of the rolling belt 90 are respectively supported separately from each other on support bearings 124a, 124b and 124c, 124d respectively in openings 100a, 100b and 100c in the feed conveyor drum 100.

FIG. 13 also shows the suction ducts 126 which were referred to hereinbefore in connection with FIG. 12 and which extend radially into the troughs 106 within the conveyor drum.

FIG. 13 also shows the openings 116 in the rolling block 96 for the laser beam 2, as described with reference to FIG. 12.

Figure 14:
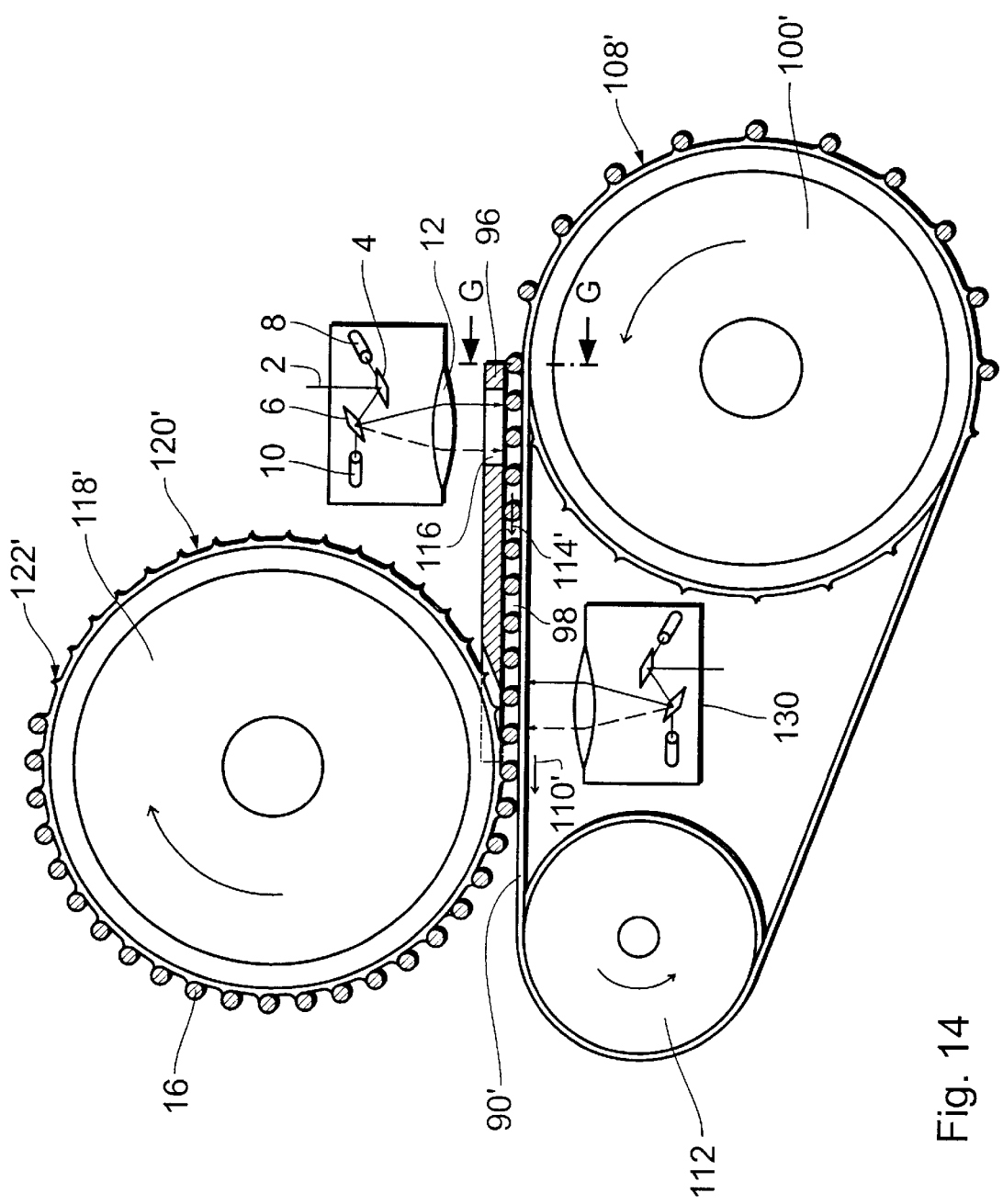
FIG. 14 shows a seventh embodiment of the perforating apparatus according to the invention, in which the rolling belt is in the form of a transport means and which has two operative zones.

FIG. 14 shows a seventh embodiment of the perforating apparatus according to the invention. Parts which are the same as those of the embodiment shown in FIG. 12 are denoted by the same references. In contrast to the embodiment of FIG. 12, this seventh embodiment has a rolling belt 90' which circulates at the same peripheral speed as a feed conveyor drum 100'. This means that the pitch distance or division of the double filter cigarettes 16 on the peripheral surface 108' of the feed conveyor drum 100' is twice as great as the pitch distance or division of the double filter cigarettes 16 in the rolling passage 98. The pitch distance of the double filter cigarettes 16 in the rolling passage 98 is thus smaller than the periphery of the double filter cigarettes 16. Accordingly, only each second double filter cigarette 16 can be perforated by the laser beam 2, in the operative zone formed by the first recesses 16. The remaining double filter cigarettes 16 are perforated at the end of the rolling passage by a second laser beam arrangement of an identical structure to the above-described laser beam arrangements. This ensures that each double filter cigarette leaves the rolling passage 98, in a perforated condition. After leaving the rolling passage 98, the double filter cigarettes 16 are conveyed by a discharge conveyor drum 118'. In comparison with the discharge conveyor drum 118 described with reference to FIG. 12, the discharge conveyor drum 118' has twice the number of troughs 122' for receiving double filter cigarettes 16 on the peripheral surface 120' thereof. Accordingly the discharge conveyor drum 118' also has double the number of troughs 122', that is to say double the pitch distance with respect to the feed conveyor drum 100'.

Figure 15:
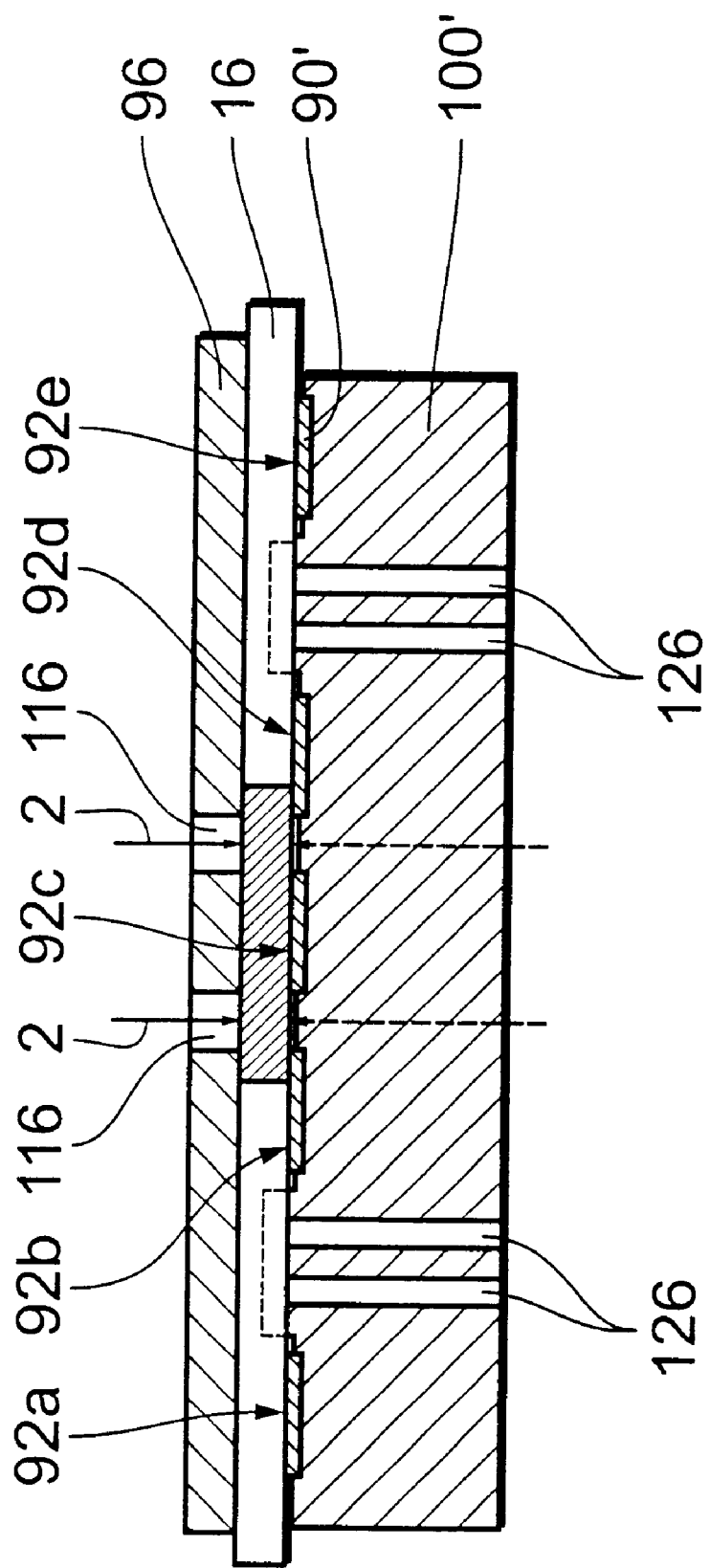
FIG. 15 shows a section G—G through the perforating apparatus of FIG. 14.

FIG. 15 is a view in section taken along line G—G in FIG. 14. Unlike the sectional view shown in FIG. 13, it will be clear that the rolling belt 90' itself forms the peripheral surface 108' of the feed conveyor drum 100'. In this case also the rolling belt 90' is subdivided so that, in this construction also, the arrangement affords the surfaces 92a to 92e of the rolling belt 90', which have already been described in detail with reference to FIG. 13. It is thus clear that the rolling belt 90' moves at the same peripheral speed as the feed conveyor drum 100'.

Figure 16:
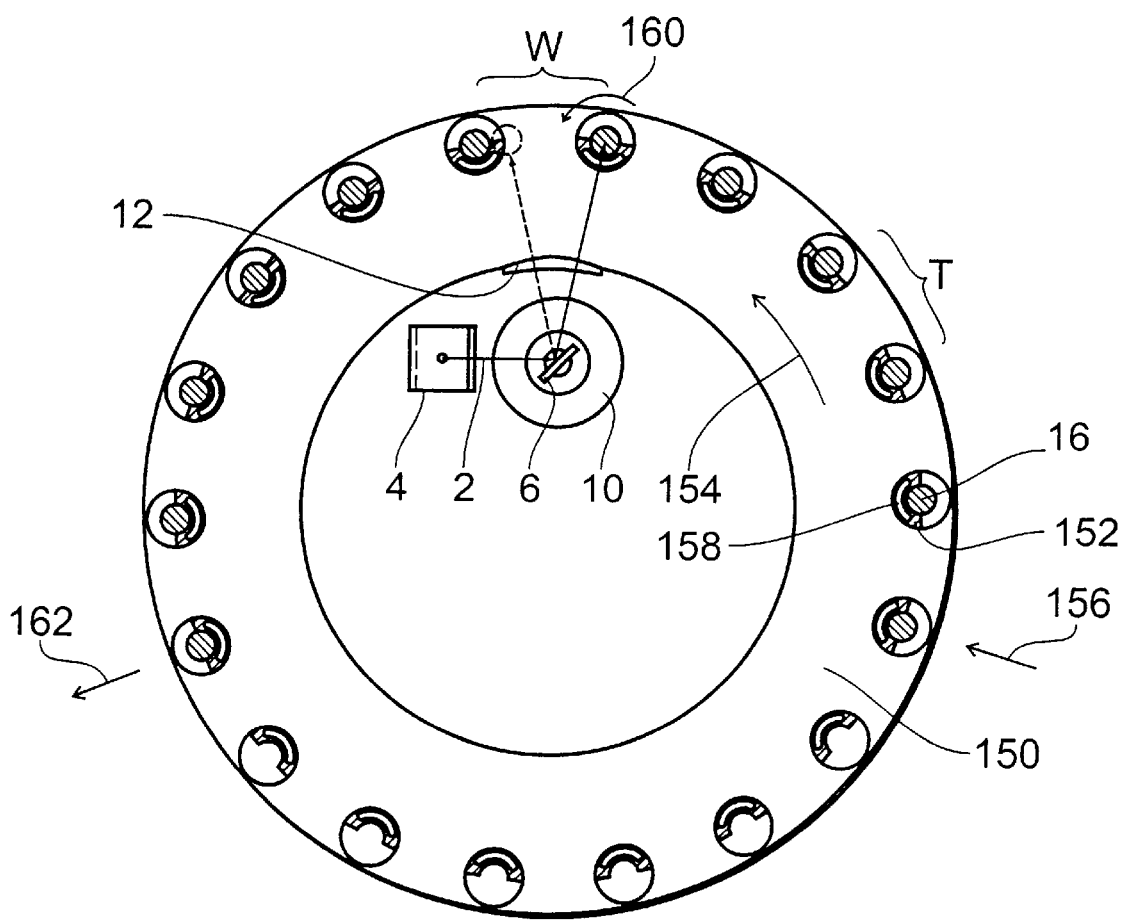
FIG. 16 shows a diagrammatic side view of a further embodiment of the perforating apparatus.

FIG. 16 is a diagrammatic side view of a further embodiment of the perforating apparatus according to the invention. The parts which are the same as parts of preceding embodiments are denoted by the same references. This Figure shows a side view of a transport drum 150 serving as the transport means according to the invention. At its periphery, the transport drum 150 carries troughs 152 serving as receiving means according to the invention. The troughs 152 are arranged in axially transverse relationship with respect to the direction 154 of conveying movement of the transport drum 150, with a pitch distance or division T, on the transport drum 150.

At the location identified by the arrow 156, the double filter cigarettes 16 to be perforated are fed to the transport drum 150 by way of a feed conveyor drum (not shown). As soon as the double filter cigarettes 16 come to lie in the troughs 152, they are subjected to the action of suction air by way of suction ducts 158 diagrammatically illustrated in FIG. 16, and are retained thereby in the troughs 152.

While the transport drum 150 rotates in the direction 154 of conveying movement, the troughs 152 together with the double filter cigarettes 16 firstly remain in the rest position shown in FIG. 16. As soon as the troughs 152 pass into the region of the operative zone W of the laser beam 2 however, the troughs 152 are caused to rotate by way of rotating means described hereinafter with reference to FIG. 22, so that the double filter cigarettes 16 perform a rotary movement through 3600 while they are in the operative zone W. That rotary movement of the double filter cigarettes 16 about their own axis, in the operative zone W, is symbolically indicated by the arrow 160. While the double filter cigarettes 16 are moving through the operative zone W, the laser beam 2 is guided to track the double filter cigarette 16 in the rotating trough 152, by means of the pivoting mirror 6 which is driven by the drive 10.

After leaving the operative zone W, the trough 152 is again in the rest position in which it was also disposed, before passing into the operative zone W. The double filter cigarette 16 which has now been perforated is then transferred to a discharge conveyor drum (not shown), at the location marked by the arrow 162.

Figure 17:
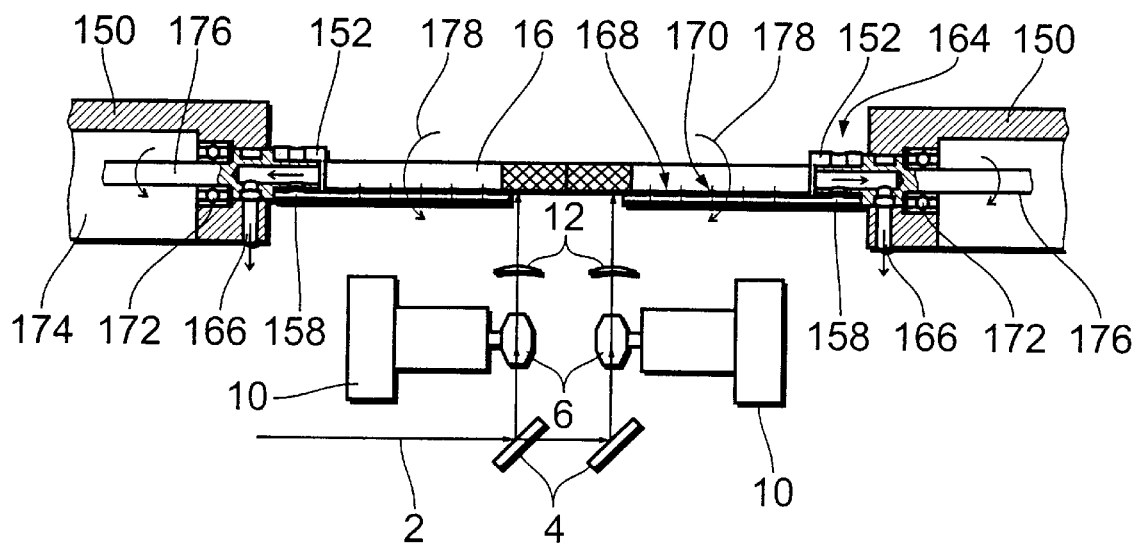
FIG. 17 is a diagrammatic view showing the principle of the perforating apparatus of FIG. 16.

FIG. 17 is a diagrammatic view showing the principle of the perforating apparatus illustrated in FIG. 16. In particular, FIG. 17 shows that the transport drum 150 carries an opening or recess 164, on its periphery. Disposed in that opening or recess 164 in opposite mirror-image relationship are the troughs 152 which are arranged in axially transverse relationship with respect to the direction of conveying movement. A double filter cigarette 16 to be perforated is disposed in the troughs 152.

The troughs 152 have respective suction ducts 158. The suction ducts 158 are communicated with a suction air duct system 166 in the transport drum 150. In order to suck the double filter cigarettes 16 against the surface 168 of the troughs 152, small bores 170 are provided in the surface 168 of the troughs 152. The small bores 170 respectively communicate the surface 168 with the suction ducts 158.

The troughs 152 are each mounted rotatably in bearings 172 in the transport drum 150. The troughs 152 are provided with an extension portion 176 extending through the bearings 172 into the interior 174 of the transport drum 150. The extension portion 176 is driven by the rotating means described hereinafter with reference to FIG. 22. That arrangement makes it possible to produce the rotary movement of the double filter cigarettes 16 about their longitudinal axis in the rotating troughs 152, as diagrammatically indicated by the arrows 178.

Figure 18:
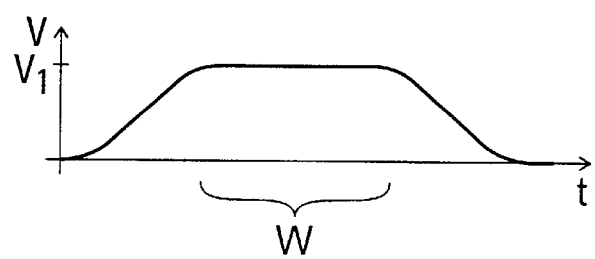
FIG. 18 shows a graph illustrating the variation in relation to time of the rotary speed of the troughs shown in FIG. 17.

FIG. 18 shows a graph illustrating the variation in relation to time of the rotary speed of the troughs 152 shown in FIG. 17. This Figure shows that the rotary speed V is constant while the double filter cigarettes 16 are in the operative zone W. Before reaching the operative zone W, the rotary speed V is raised from the rest condition substantially linearly to the desired final speed V1. After the cigarette leaves the operative zone W, the rotary speed is then reduced again from the speed V1 to 0 so that the troughs 152 come to a halt in their position.

Figure 19:
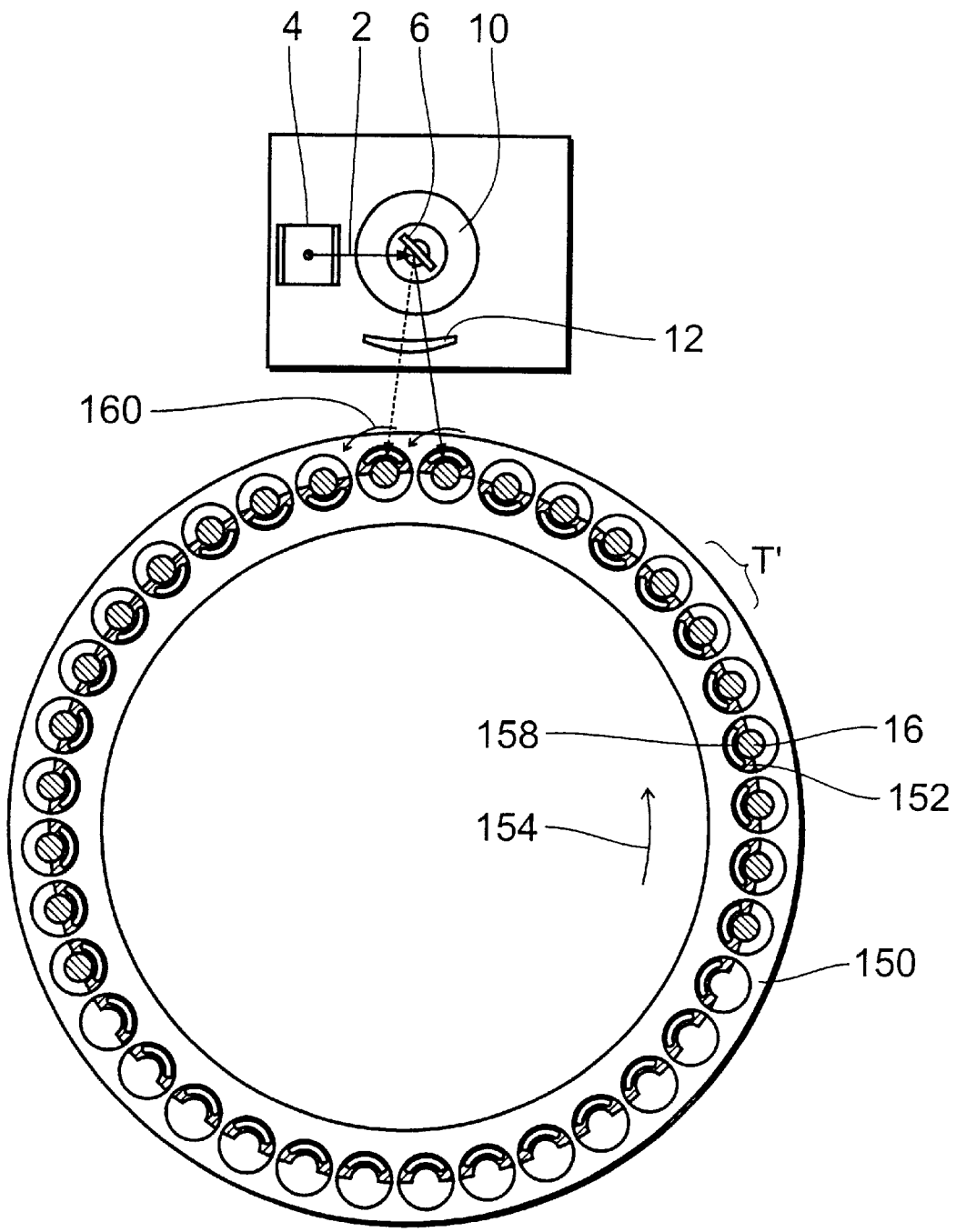
FIG. 19 is a diagrammatic view of a further embodiment of a perforating apparatus.

FIG. 19 is a diagrammatic view of a further embodiment of a perforating apparatus. The embodiment of FIG. 19 is substantially the same as that shown in FIG. 16. In contrast to FIG. 16 however, the embodiment of FIG. 19 involves a smaller pitch distance or division T. In addition, in the embodiment of FIG. 19, the laser beam 2 does not operate out of the interior of the transport drum 150 on the double filter cigarettes 16, but it is arranged outside the transport drum 150.

Figure 20:
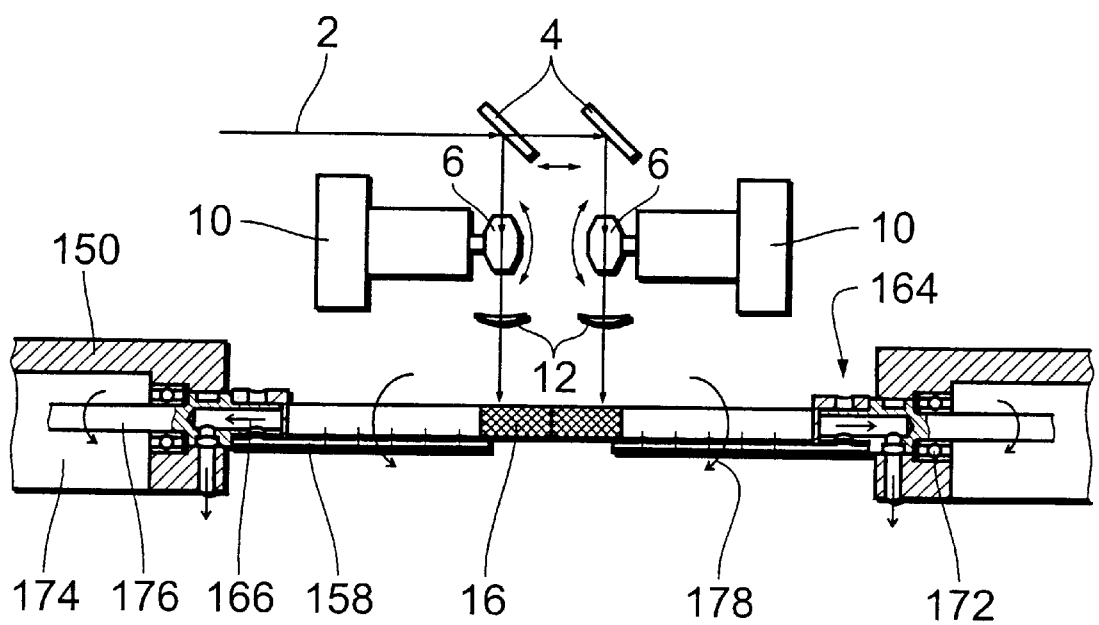
FIG. 20 is a diagrammatic view showing the principle of operation of the embodiment of FIG. 19.
Figure 21:
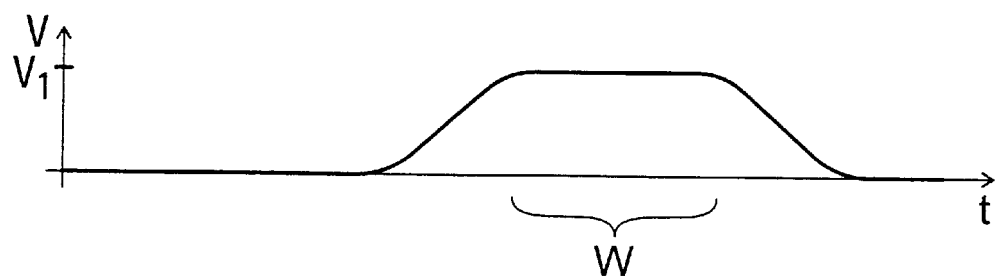
FIG. 21 shows a graph illustrating the variation in relation to time of the rotary speed of the troughs in FIG. 20.

FIGS. 20 and 21 correspond in substance to FIGS. 17 and 18 so that there is no need for them to be described in detail again at this point.

Figure 22:
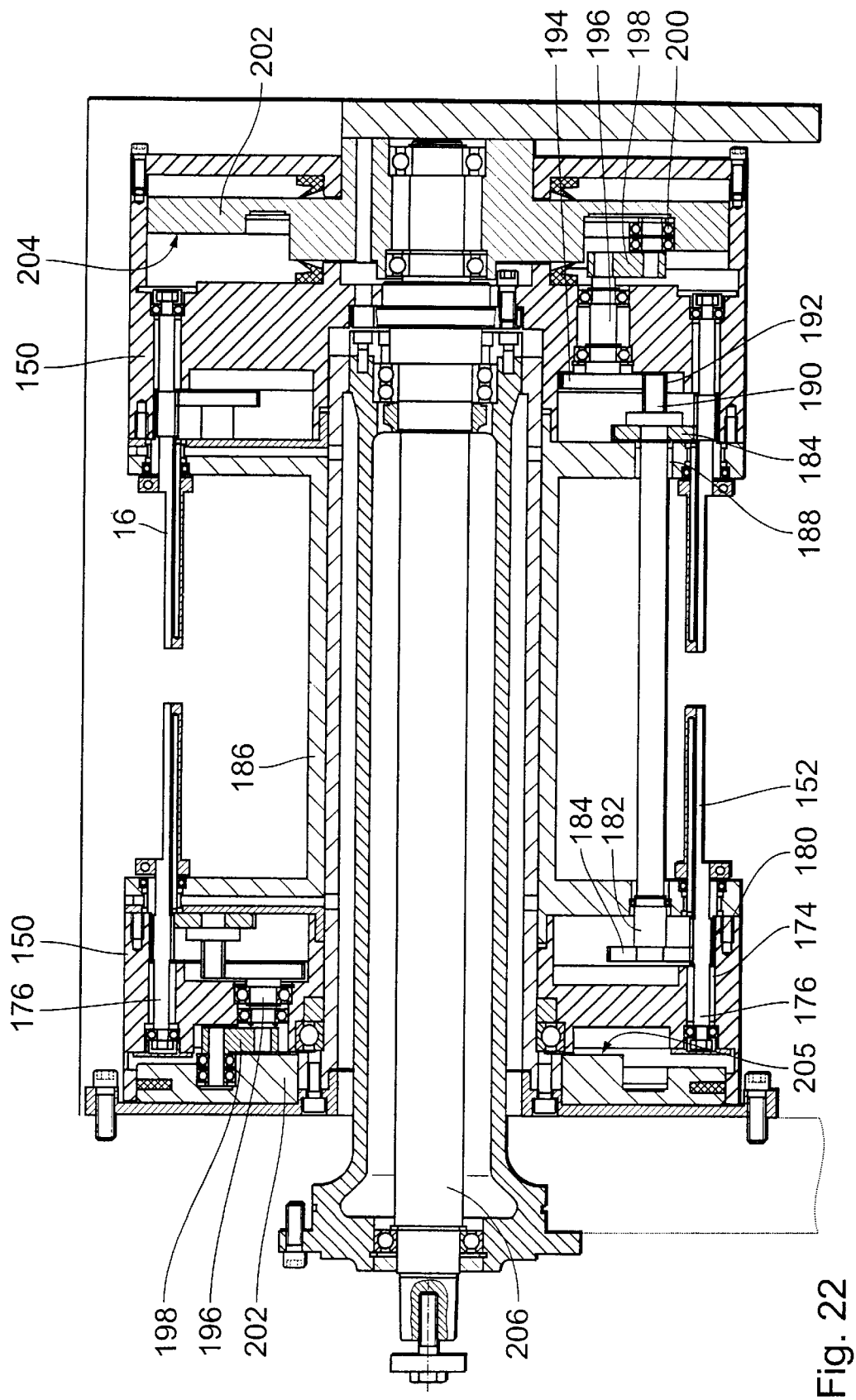
FIG. 22 is a section through the transport drum shown in FIG. 19.

FIG. 22 shows a view in section through the transport drum 150 illustrated in FIG. 19. It will be seen that there are respectively two pairs of mutually opposite disposed troughs 152. FIG. 22 however shows the troughs 152 without double filter cigarettes 16 disposed therein. The extension portions 176 of the troughs 152, which extend into the interior 174 of the transport drum 150, carry respective pinions 180. Those pinions 180 respectively mesh with gears 184 disposed on a drive shaft 182. The drive shaft 182 which is supported in a flange 186 in the transport drum 150 in a needle bearing 188 also carries a pinion 192 at its end 190. The pinion 192 meshes with a second gear 194. The second gear 194 is carried on a shaft 196. That shaft 196 is nonrotatably connected to a lever 198. The lever 198 runs with rollers 200 in a U-shaped control cam 202 which is disposed in the inside 204 of the end wall of the transport drum 150.

When the transport drum 150 is driven in rotation by means of the drive shaft 206, then the lever 198 or the rollers 200 on the lever 198 are positively guided in the stationary control cam 202. That produces a pivotal movement of the lever 198 about the axis of rotation of the shaft 196. By way of the second gear 194, the pinion 192, the drive shaft 190, the first gear 184 and finally the pinion 180, that pivotal movement of the lever 198 is then converted into a rotational movement of the trough 152. Troughs 152 which are in adjacent relationship along the periphery of the transport drum 150 are controlled by means of levers 198 which run in respective oppositely disposed insides 204, 205 of the drum end walls. FIG. 22 therefore illustrates the troughs 152 shown at the top in the Figure, as being controlled by the control cam 202 shown at the left in the Figure, in the inside 205 of the end wall of the drum illustrated on the left-hand side, while the troughs 152 shown at the bottom in the Figure are controlled by the control cam 202 shown at the right, in the right-hand end wall 204.

A rotary movement of the troughs 152 about their axis can be produced, as shown in FIG. 18, by virtue of a suitable configuration for the control cam 202, by means of the above-described conversion of the pivotal movement of the lever 198.

FIG. 23 shows a view in section through FIG. 22 including the laser tracking and focusing devices which are shown in the upper part of FIG. 19. In FIG. 23, parts which are the same as parts in the preceding Figures are denoted by the same references. FIG. 23, in addition to the section shown in FIG. 22, also illustrates a double filter cigarette 16 which is disposed in the troughs 152 shown at the top. The laser beam 2, together with the pivoting mirrors 4 and 6 and the lenses, are diagrammatically shown in FIG. 23, above the double filter cigarette 16. In other respects, FIG. 23 differs from the embodiment illustrated in FIG. 2, only in terms of the drawing techniques involved.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications as to fall within the true spirit of the invention.

What is claimed is:

1. A perforating apparatus for producing openings in a peripheral surface of substantially elongate, cylindrical objects comprising:
    at least one light source for producing at least one high-energy light beam;
    a guidance tracking means for the guided tracking of the light beam in at least one operative zone within which the light beam produces openings in the peripheral surface of the substantially elongate, cylindrical objects;
    rolling means for producing a rotary movement of the objects about their longitudinal axis while the objects are moving through the operative zone in order to expose the peripheral surface of each object to the light beam;
    transport means for conveying the object through the operative zone; and
    a stationary light-refracting means through which the light beam is passed before reaching the operative zone, so that in the guided tracking of the light beam, the light beam remains focused within the operative zone, said refracting means comprising a focus-corrected lens.

2. A perforating apparatus according to claim 1, wherein the transport means conveys the objects through the operative zone on a transport path which extends substantially perpendicularly to the light beams which issue from the light-refracting means.

3. A perforating apparatus according to claim 1, wherein the transport means conveys the objects, during their passage through the operative zone, on a transport path, which extends substantially parallel to the plane of the light-refracting means.

4. A perforating apparatus according claim 1, wherein the transport means have a transverse conveyor on which the objects are conveyed in an axially transverse relationship.

5. A perforating apparatus according to claim 4, wherein the transverse conveyor has openings for receiving the objects, the objects being disposed in said openings while they are caused to rotate about their own axis by the rolling means.

6. A perforating apparatus according to claim 4, wherein the transverse conveyor comprises a belt conveyor.

7. A perforating apparatus according to claim 4, wherein the transverse conveyor comprises a rolling drum.

8. A perforating apparatus according claim 4, wherein the rolling means further comprises a counterpart rolling surface located opposite the transport means, so that the objects are rotated between the transport means and the counterpart rolling surface transversely with respect to the direction of conveyance of the transport means.

9. A perforating apparatus according to claim 8, wherein the counterpart rolling surface comprises a counterpart rolling belt.

10. A perforating apparatus according to claim 8, wherein the counterpart rolling surface comprises a counterpart rolling drum.

11. A perforating apparatus according to claim 8, wherein the counterpart rolling surface and the transverse conveyor move in the same direction.

12. A perforating apparatus according to claim 11, wherein the speeds of the counterpart rolling surface and the transverse conveyor are such that the objects continue to move in the original direction of conveyance of the transport means.

13. A perforating apparatus according to claim 12, wherein during the rotation of the objects, the objects are still moved at the original speed of conveyance of the transport means.

14. A perforating apparatus according to claim 12, wherein during the rotation of the objects, the objects are moved at an increased speed in comparison with the original speed of conveyance of the transport means.

15. A perforating apparatus according to claim 12 wherein during the rotation of the objects, the objects are moved at a reduced speed in comparison with the original speed of conveyance of the transport means.

16. A perforating apparatus according to claim 1, wherein the objects rotate once about their own axis while in the operative zone.

17. A perforating apparatus according to claim 8, wherein said rolling means further comprises a rolling surface on the same side of the operative zone as the transport means and which is in opposite relationship to the counterpart rolling surface, so that the objects are rolled between the counterpart rolling surface and the rolling surface.

18. A perforating apparatus according to claim 17, wherein the rolling surface comprises a rolling belt.

19. A perforating apparatus according to claim 18, wherein the rolling belt and the transport means move in the same direction.

20. A perforating apparatus according to claim 18, wherein the rolling belt and the transport means move in opposite directions, while the counterpart rolling means moves in the same direction as the transport means.

21. A perforating apparatus according to claim 18, wherein the rolling belt serves at the same time as a transport means for the objects.

22. A perforating apparatus according to claim 8, wherein the counterpart rolling surface comprises a counterpart rolling block.

23. A perforating apparatus according to claim 22, wherein the counterpart rolling block has openings through which the light beam can perforate the objects.

24. A perforating apparatus according to claim 22, further comprising:
- a rolling passage for the objects formed by the rolling belt and the counterpart rolling block;
- feed means for feeding the objects to the rolling passage;
- discharge means for discharging the objects from the rolling passage.

25. A perforating apparatus according to claim 24, wherein the pitch distance of the objects in the rolling passage is greater than the periphery thereof so that the objects can be successively perforated by the light beam.

26. A perforating apparatus according to claim 24, wherein the pitch distance of the objects in the rolling passage is smaller than their periphery so that along the rolling passage there are at least two operative zones, such that all objects passing through the rolling passage can be perforated by the co-operation of all operative zones.

27. A perforating apparatus according to claim 26, wherein the pitch distance of the objects in the rolling passage is half the size of their periphery and two operative zones are provided, so that each second object which passes the respective operative zone can be perforated in successively displaced relationship in each operative zone.

28. A perforating apparatus according to claim 22, wherein the rolling belt moves at the same speed as the feed means.

29. A perforating apparatus according to claim 1, wherein the guidance tracking means further comprises a pivoting mirror or a rotating prism mirror in the path of the light beam.

30. A perforating apparatus according to claim 1, wherein the light source comprises a laser.

31. A perforating apparatus according to claim 1, wherein the rolling means is a part of the transport means.

32. A perforating apparatus according to claim 31, further comprising:
- rotatable receiving means for receiving the objects;
- rotating means for rotating said receiving means;
- wherein said transport means further comprises a transverse conveyor on which the objects are conveyed in an axially transverse relationship and said receiving means is rotatable to produce a rotary movement of the objects about their longitudinal axis.

33. A perforating apparatus according to claim 32, wherein the receiving means comprise troughs, which include a suction means in order to retain the objects therein.

34. A perforating apparatus according claim 32, wherein the receiving means are rotatably mounted on a transport drum having end walls.

35. A perforating apparatus according to claim 34, wherein said transport drum has a given pitch distance, so that the receiving means are rotated by the rotating means in such a way that the objects are rotated through about 360° within a rotational movement of the transport drum through said pitch distance.

36. A perforating apparatus according to claim 34, wherein at least one of the following, a light source, a tracking means and light-refracting means are arranged within the transport drum.

37. A perforating apparatus according to claim 34, wherein said transport drum further comprises two rows of receiving means, with given pitch distances, arranged along the periphery of the transport drum and being disposed in opposite, mirror-image relationship to one another.

38. A perforating apparatus according to claim 37, wherein said rotating means comprises a drive shaft, a first gear means mounted on said drive shaft, a first pair of pinions respectively secured to said two receiving means, so that said rotatable receiving means is rotated by said first pair of pinions, which are attached to the receiving means and mesh with the first gear means, which is arranged on the drive shaft, to rotate the receiving means.

39. A perforating apparatus according to claim 38, further comprising:
- a control means arranged at one end wall inside of said transport drum;
- a second gear means driven by said control means;
- a second pinion mounted on said drive shaft which meshes with said second gear means;
- wherein said control means drives said second gear means, which in turn meshes with said second pinion and drives said drive shaft which drives said receiving means.

40. A perforating apparatus according to claim 39, wherein said control means includes a lever which is guided in a stationary control cam.

41. A perforating apparatus according to claim 40, wherein the control cam comprises a U-shape groove formed on the inside of the end wall of the transport drum.

42. A perforating apparatus according to claim 37, wherein the receiving means, which are in adjacent relationship along with periphery of the transport drum, each have their own rotating means.

43. A perforating apparatus according to claim 39, wherein the receiving means, which are in adjacent relationship along the periphery of the transport means, each have their own control means, said control means of said adjacent receiving means of each arranged alternatively in the region of one of the two ends of the transport drum.

44. A perforating apparatus according to one of claim 32, wherein the receiving means are rotatable by the rotating means in such a way that the rotary movement of the objects takes place during the movement of the objects through the operative zone.

45. A perforating apparatus according to claim 32, wherein the receiving means are rotatable by said rotating means so that the rotation of the objects only takes place in the operative zone.

46. A perforating apparatus according to claim 32, wherein the receiving means are rotated by the rotating means so that rotation of the objects is uniform while in the operative zone.

47. A perforating apparatus according to claim 32, wherein the receiving means are rotated by the rotating means in such a way that the objects are rotated through about 360° by the receiving means while in the operative zone.

48. A perforating apparatus according to claim 32, wherein the receiving means are rotated by the rotating means in such a way that the objects can be accelerated by the receiving means from an at rest condition before reaching the operative zone to a pre-settable rotary speed during movement through the operative zone.

49. A perforating apparatus according to claim 32, wherein the receiving means are rotated by the rotating means in such a way that the objects can be braked by the receiving means from a pre-settable rotary speed while moving in the operative zone, to a rest condition.

* * * * *